US011043013B2

(12) United States Patent
Jung et al.

(10) Patent No.: US 11,043,013 B2
(45) Date of Patent: Jun. 22, 2021

(54) DISPLAY APPARATUS CONTROL METHOD AND DISPLAY APPARATUS USING THE SAME

(71) Applicant: SAMSUNG ELECTRONICS CO., LTD., Suwon-si (KR)

(72) Inventors: Minhyo Jung, Suwon-si (KR); Seongoh Lee, Suwon-si (KR); Hyunsoo Lee, Suwon-si (KR); Youngmin Kwak, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/585,227

(22) Filed: Sep. 27, 2019

(65) Prior Publication Data
US 2020/0105029 A1    Apr. 2, 2020

(30) Foreign Application Priority Data

Sep. 28, 2018  (KR) .................. 10-2018-0116581

(51) Int. Cl.
G06T 11/00       (2006.01)
G06T 1/20        (2006.01)
G06T 3/40        (2006.01)
G06T 5/50        (2006.01)
G09G 5/37        (2006.01)

(52) U.S. Cl.
CPC .............. G06T 11/001 (2013.01); G06T 5/50 (2013.01); G09G 5/37 (2013.01); G06T 2200/24 (2013.01); G06T 2207/20084 (2013.01); G09G 2354/00 (2013.01)

(58) Field of Classification Search
CPC combination set(s) only.
See application file for complete search history.

(56) References Cited

U.S. PATENT DOCUMENTS 9,225,905    B2    12/2015    Yoon et al.
2002/0122043 A1    9/2002    Freeman et al.
2014/0071148 A1    3/2014    Webb et al.
2018/0068463 A1    3/2018    Risser
2018/0082715 A1    3/2018    Rymkowski et al.
(Continued)

FOREIGN PATENT DOCUMENTS

KR    10-2014-0018686    2/2014
KR    10-2016-0058621    5/2016
WO    2017/077121        5/2017

OTHER PUBLICATIONS

Extended Search Report dated Nov. 8, 2019 in counterpart European Patent Application No. 19200276.4.
(Continued)

Primary Examiner — Wesner Sajous
(74) Attorney, Agent, or Firm — Nixon & Vanderhye P.C.

(57) ABSTRACT

A display apparatus includes a display, a memory configured to store at least one instruction, and a controller including at least one processor configured to execute the at least one instruction to control the display apparatus. According to the display apparatus, as a user may watch an image having a unique style, for example, an AI-based style transferred third image, without feeling bored, while the image is style transferred and generated, user needs may be met and user convenience may be increased.

18 Claims, 15 Drawing Sheets

(56) References Cited

U.S. PATENT DOCUMENTS

| | | | | |
|---|---|---|---|---|
| 2018/0144509 A1* | 5/2018 | Risser | .................. | G06T 11/001 |
| 2019/0220746 A1* | 7/2019 | Liu | .......................... | G06N 3/08 |
| 2019/0244060 A1* | 8/2019 | Dundar | ............... | G06K 9/6256 |
| 2019/0370936 A1* | 12/2019 | Zhang | .................. | G06T 3/4046 |
| 2020/0035010 A1* | 1/2020 | Kim | ....................... | G06T 13/40 |
| 2020/0151849 A1* | 5/2020 | Liao | ..................... | G06T 3/0012 |

OTHER PUBLICATIONS

International Search Report and Written Opinion dated Jan. 8, 2020 in counterpart International Application No. PCT/KR2019/012576.
Zhang, Wei et al, "Style Transfer Via Image Component Analysis," IEEE Transactions on Multimedia, IEEE Service Center, Piscataway, NJ, US, vol. 15, No. 7, Nov. 1, 2013, pp. 1594-1601.
Nikulin, Yaroslav et al, "Exploring the Neural Algorithm of Artistic Style," Feb. 23, 2016, pp. 1-15, retrieved from the internet: URL:https://arxiv.org/pdf/1602.07188.pdf, retrieved Mar. 19, 2019.
Novak, Roman et al, "Improving the Neural Algorithm of Artistic Style," arxiv.org, Cornell University Library, Ithaca, NY, May 15, 2016, pp. 1-15.
Gatys, Leon et al, "A Neural Algorithm of Artistic Style," Journal of Vision, vol. 16, No. 12, Sep. 1, 2016, pp. 1-16.
Dushkoff, Michael et al, "A Temporally Coherent Neural Algorithm for Artistic Style Transfer," 2016 23rd Internation Conference on Pattern Recognition (ICPR), IEEE, Dec. 4, 2016, pp. 3288-3293.
Berry Kim, "Dynamic Auto Painter", Mar. 31, 2015, w/ English Translation, 17 pages.

* cited by examiner

FIG. 7
710
+
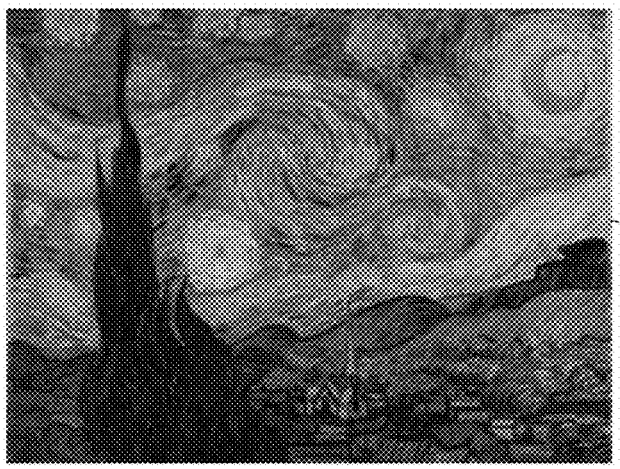
720
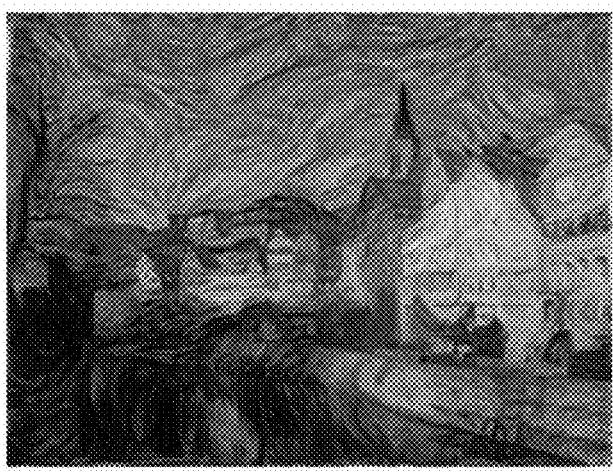
730

DISPLAY APPARATUS CONTROL METHOD AND DISPLAY APPARATUS USING THE SAME

CROSS-REFERENCE TO RELATED APPLICATION

This application is based on and claims priority under 35 U.S.C. § 119 to Korean Patent Application No. 10-2018-0116581, filed on Sep. 28, 2018, in the Korean Intellectual Property Office, the disclosure of which is incorporated by reference herein in its entirety.

BACKGROUND

1. Field

The disclosure relates to a method of controlling a display apparatus and a display apparatus using the same.

For example, the disclosure relates to a method of controlling a display apparatus for displaying a style transferred image and a display apparatus using the same.

2. Description of Related Art

With the distribution of displays and the development of technologies, display apparatuses having various shapes and functions have been developed.

Accordingly, functions meeting various needs or intentions of consumers may be implemented using a display apparatus.

For example, products that utilize a display apparatus as a picture frame for displaying an image such as a picture or a masterpiece painting have been released. In detail, when a user does not watch certain content through a display apparatus, the display apparatus may output a certain screen, for example, a screen including a picture or a masterpiece painting. In this case, the user may use a display apparatus as a masterpiece painting frame or a large picture frame.

Furthermore, a user may wish to display a style transferred image on a display apparatus considering one's own artistic taste or atmosphere of a place where the display apparatus is located. In this case, the display apparatus may need to rapidly generate an image that meets the user's artistic taste or desire.

As described above, there is a demand for providing a display apparatus that meets various users desires and intention.

SUMMARY

Embodiments of the disclosure provide a method of controlling a display apparatus, by which an image meeting a user's artistic taste and desire may be rapidly generated, and a display apparatus using the same.

Embodiments of the disclosure provide a method of controlling a display apparatus, by which images may be generated and displayed such that a user does not feel bored during an image generation time by performing an operation through, for example, a neural network, and a display apparatus using the method.

Additional aspects will be set forth in part in the description which follows and, in part, will be apparent from the description, or may be learned by practice of the presented embodiments of the disclosure.

According to an example embodiment of the disclosure, a display apparatus includes a display, a memory configured to store at least one instruction, and a controller including at least one processor configured to execute the at least one instruction. The controller is configured to control the display apparatus to: control generation of at least one second image comprising a style transferred by performing image processing based on a result of analyzing a first image having a first style corresponding to a certain texture, control generation of a third image by performing an operation for style transfer of the first image using a neural network, and control outputting of the at least one second image and subsequent outputting of the third image on the display.

The controller may be further configured to control the display apparatus to: generate the at least one second image that may be gradually changed in a process in which image processing may be performed to allow the first image to have the first style, and perform image transition to output, on the display, the third image after the at least one second image that may be gradually changed may be sequentially output.

The controller may be further configured to control the display apparatus to generate the at least one second image by performing a simulation-based style transfer to allow the first image to have the certain texture based on edge information of the first image.

The controller may be further configured to control the display apparatus to control sequential outputting of the at least one second image on the display based on a generation order of the at least one second image.

The controller may be further configured to control the display apparatus to control generation of the third image corresponding to the first style by performing an operation through the neural network for style transfer of the first image.

The controller may be further configured control the display apparatus to obtain a content image and style of the first image, and generate the third image by converting the style of the first image to correspond to the first style while maintaining the content image by performing an operation through the neural network.

The controller may include a first photo filter corresponding to the first style, the first photo filter configured to perform a simulation-based style transfer, and may be further configured to control the display apparatus to control generation of the at least one second image using the first photo filter.

The controller may be further configured to control the display apparatus to control generation of the at least one second image by performing image processing to allow the first image to have the first style using the first photo filter based on receiving an input selecting the first style that may be one of a plurality of different styles.

The display apparatus may further include a communicator comprising communication circuitry configured to perform communication with an external apparatus. The controller may be further configured to control the display apparatus to receive the input selecting the first style among the plurality of styles from the external apparatus through the communicator.

The display apparatus may further include a communicator comprising communication circuitry configured to perform communication with an external apparatus that is configured to perform an operation for the style transfer through the neural network. The controller may be further configured to control the display apparatus to control receiving of the third image that may be obtained as the external apparatus performs an operation through the neural network.

The neural network may include, for example, and without limitation, a convolution neural network (CNN) that repeatedly performs a convolution operation to allow the first image to correspond to the first style.

The controller may be further configured to control the display apparatus to control outputting of the at least one second image and the third image on the display during execution of an ambient service.

According to another example embodiment of the disclosure, a method of controlling a display apparatus includes generating at least one second image that is style transferred by performing image processing based on a result of analyzing a first image having a first style corresponding to a certain texture, generating a third image by performing an operation for style transfer of the first image using a neural network, and outputting the at least one second image and subsequently outputting the third image on a display.

BRIEF DESCRIPTION OF THE DRAWINGS

The above and other aspects, features, and advantages of certain embodiments of the disclosure will be more apparent from the following detailed description, taken in conjunction with the accompanying drawings, in which:

FIG. 7 is a diagram illustrating an example style transfer operation through a neural network according to an embodiment of the disclosure;

DETAILED DESCRIPTION

Figure 1:
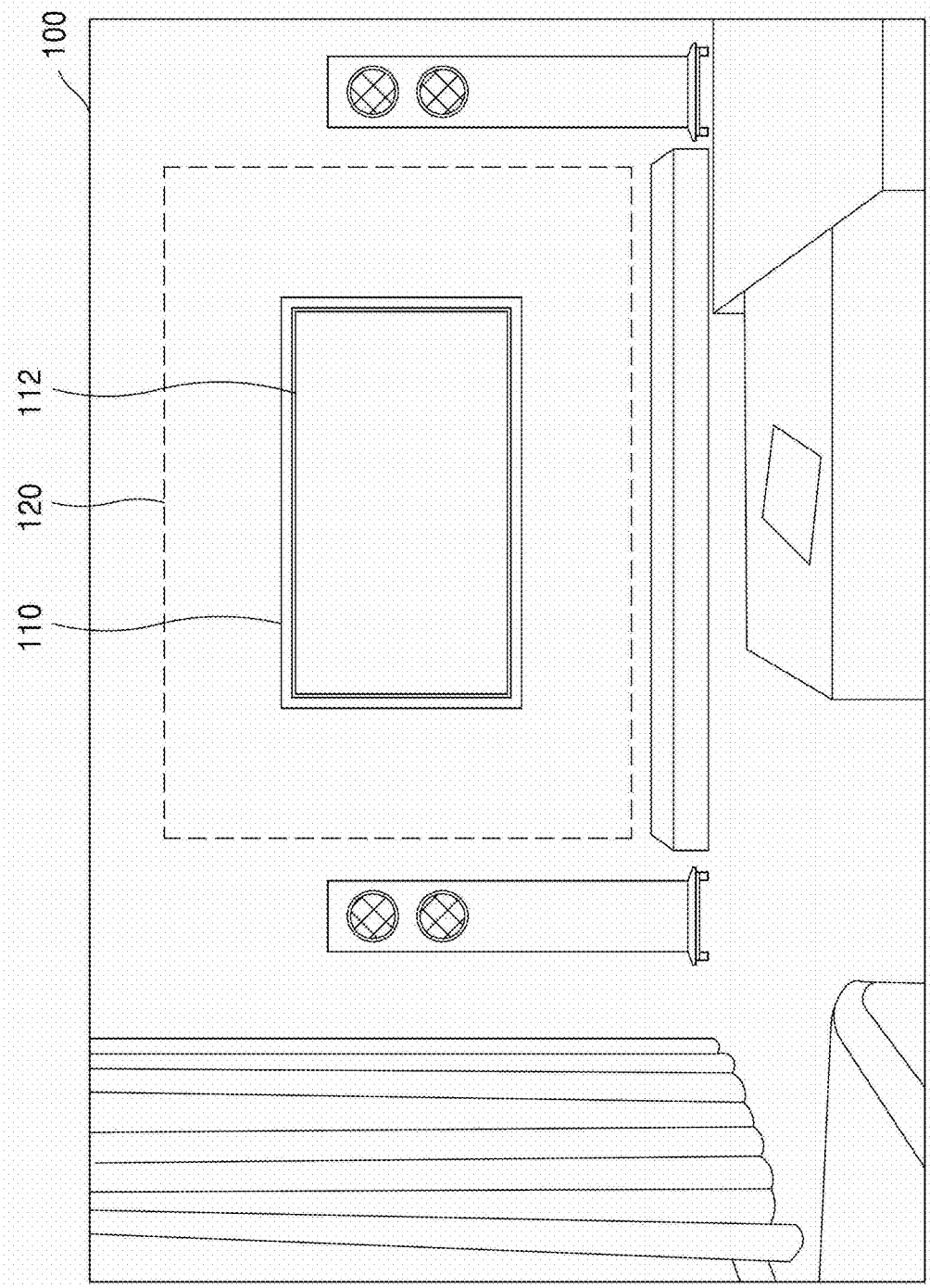
FIG. 1 is a diagram illustrating an example general display apparatus according to an embodiment of the disclosure.

The disclosure will now be described in greater detail with reference to the accompanying drawings, in which various example embodiments of the disclosure are illustrated. In the following disclosure, when detailed descriptions about related well-known functions or structures are determined to make the gist of the disclosure unclear, the detailed descriptions may be omitted herein. Throughout the drawings, like reference numerals denote like elements.

In the present disclosure, when an element "connects" or is "connected" to another element, the element contacts or is connected to the other element not only directly, but also electrically through at least one of other elements interposed therebetween. Also, when a part may "include" a certain element, unless specified otherwise, it may not be construed to exclude another element but may be construed to further include other elements.

Throughout the disclosure, the expression "in some embodiments" or "in one embodiment" may not necessarily denote the same embodiment of the disclosure.

The disclosure may be described in terms of functional block components and various processing steps. Such functional blocks may be realized by any number of hardware and/or software components configured to perform the specified functions. For example, the functional blocks of the disclosure may be implemented by one or more processors or microprocessors or by various integrated circuit components for a variety of functions. Furthermore, the functional blocks of the disclosure may be implemented with any programming or scripting language. The functional blocks may be implemented with various algorithms being executed on one or more processors. Furthermore, the disclosure could employ any number of conventional techniques for electronics configuration, signal processing and/or control, data processing and the like. The words "module" and "configuration" may be used broadly and are not limited to mechanical or physical embodiments of the disclosure.

Furthermore, connecting lines or connectors between the elements shown in the various figures are intended to represent functional relationships and/or physical or logical couplings between the various elements. It should be noted that many alternative or additional functional connections, physical connections, or logical connections may be present in a practical device.

Furthermore, throughout the disclosure, the expression "at least one of a, b or c" indicates only a, only b, only c, both a and b, both a and c, both b and c, all of a, b, and c, or variations thereof.

The disclosure will now be described in greater detail below with reference to the accompanying drawings.

A display apparatus according to an example embodiment of the disclosure may include all electronic apparatuses that visually output certain content. For example, a display apparatus according to an example embodiment of the disclosure may include all electronic apparatuses capable of selectively displaying at least one piece of content and may be present in various forms such as, for example, and without limitation, TVs, digital broadcasting terminals, tablet PCs, mobile phones, computers, laptops, or the like. Furthermore, the display apparatus may be not only of a stationary type, but also of a mobile type or a portable type that may be carried by a user.

In an example embodiment of the disclosure, the display apparatus may transceive data with an external apparatus through a wireless network. The external apparatus may, for example, and without limitation, be a server or an electronic apparatus capable of communicating with the display apparatus through a wireless communication network. For example, the external apparatus may be a server or an electronic apparatus that may transceive certain data with the display apparatus, may be paired with the display apparatus, may remotely control the display apparatus, or may be remotely controlled by the display apparatus. For example, the external apparatus may include, for example, and without limitation, computing devices such as smart phones, tablet PCs, PCs, personal digital assistants (PDAs), laptop computers, media players, servers, microservers, or the like.

FIG. 1 is a diagram illustrating an example display apparatus 110 as a general display apparatus according to an example embodiment of the disclosure.

Referring to FIG. 1, the display apparatus 110 may be disposed in a certain space 100. The display apparatus 110 may be an electronic apparatus that outputs an image through a screen 112. For example, the display apparatus 110, as an apparatus for visually outputting to a user content, an advertisement, and guidance information, a user interface screen, or the like, may be present in various forms such as TVs or digital broadcasting terminals. Furthermore, the display apparatus 110 may be not only of a stationary type, but also of a mobile type or a portable type that may be carried by a user.

As in an example illustrated in FIG. 1, the display apparatus 110, as a wall mount type display apparatus that may be detachable on a wall surface, may be provided by being attached on a certain wall surface 120. The user may want to use the display apparatus 110 as a picture frame. For example, when the user may not watch certain content, for example, a TV channel, through the display apparatus 110, the user may wish to have an image matching the user's taste or an image that fits well with the space 100 displayed. Furthermore, the user may wish not to have a general picture or painting, but an image having unique artistic quality output through the display apparatus 110 according to one's own artistic taste.

An operation of displaying a certain image while the display apparatus 110 does not reproduce certain content may, for example, be referred to as an ambient service. For example, the ambient service, which is a new application or service of a display apparatus such as a TV, may output a meaningful image such as a picture or a masterpiece painting on a screen instead of a black screen when the TV is turned off, for example, when the TV is in an off state of not reproducing certain content.

When the above-described ambient service is used, to output an image, the display apparatus 110 may be operated to generate an image corresponding to the user's intention, taste, and/or setting.

In order to generate a unique image corresponding to the user's intention and/or taste, in an embodiment of the disclosure, style transfer technology may be used. For example, in an embodiment of the disclosure, artistic style transfer technology may be used to generate an image.

An artistic style transfer may refer, for example, to converting the style of an image into a specific form while keeping the content of the image. In this regard, the image subject to the conversion may be an image digitalized by a general digital camera or a scanner, or an image that is newly created by using a drawing program. The style may be a painting style such as, for example, and without limitation, watercolor, oil painting, ink painting, point painting, 3D painting, or the like, or may refer to a painting style of a specific painter such as a Van Gogh style, a Monet style, a Mane style, a Picasso style, etc. Furthermore, the style may be classified into different styles according, for example, and without limitation, to color, atmosphere, certain brightness, certain saturation of an image, etc. For example, a starry night style or a sunflower style of Van Gogh's specific work may be referred to as a style. Furthermore, the "style" used in an embodiment of the disclosure may include any and all things that may express a painting style of a style in addition to the above-described examples.

Figure 2:
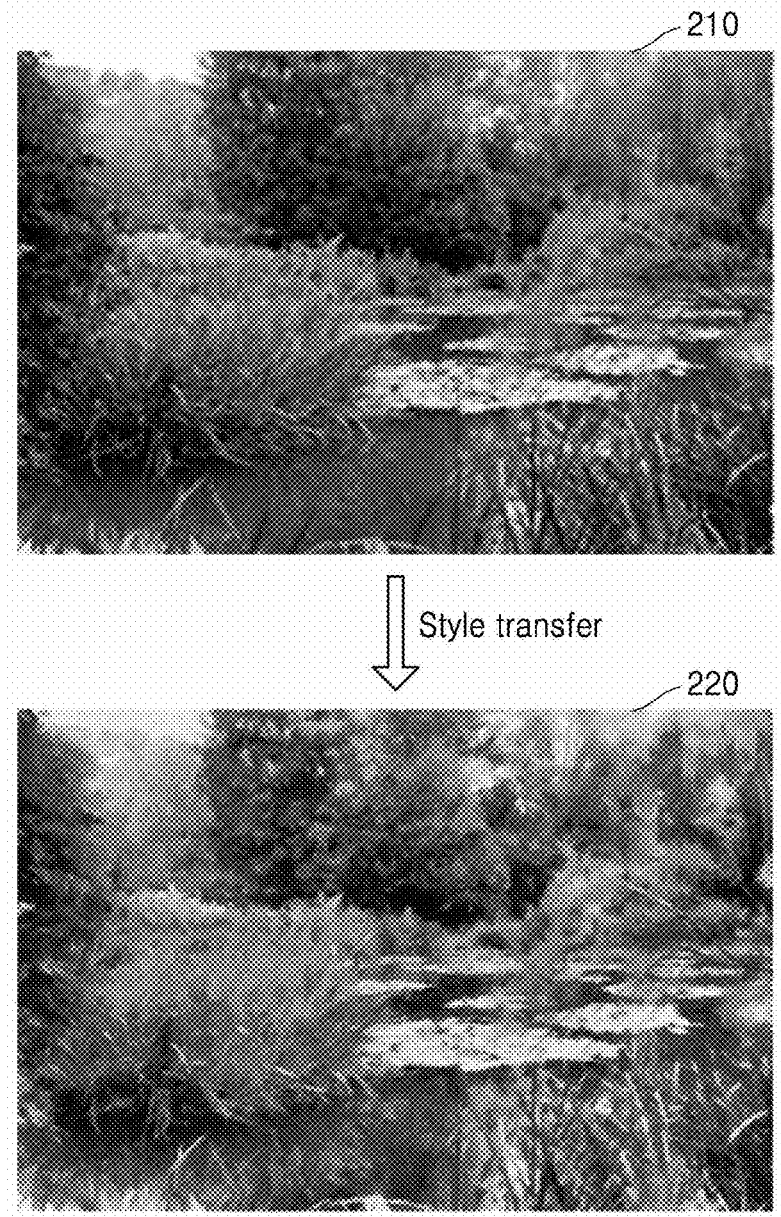
FIG. 2 is a diagram illustrating example conversion of an image through style transfer according to an embodiment of the disclosure.

FIG. 2 is a diagram illustrating example conversion of an image through style transfer according to an example embodiment of the disclosure. In FIG. 2, an example is shown, in which style transfer is performed by changing color, brightness, and saturation of an original image 210. Accordingly, an output image 220 may be generated by converting the style of the original image 210.

The above-described artistic style transfer has been developed to a method of automatically analyzing an image and then performing image processing using a predefined style from a method in which a person directly edits an image using an image editing tool such as Photoshop.

A method of performing style transfer of an image using artificial intelligence (AI) technology that performs an operation through a neural network is also provided.

In the following description, style transfer that analyzes an image and then performs image processing using a predefined style may, for example, be referred to as the "simulation-based style transfer". Furthermore, style transfer that performs image processing using AI technology may, for example, be referred to as the "AI-based style transfer".

For example, the example shown in FIG. 2 is an example in which the output image 220 is generated by performing a simulation-based style transfer. In the simulation-based style transfer, a style applied to generate an output image is a predetermined style. For example, technology needs to be developed for each style applied to style transfer, and to express an appropriate style, a texture image or image resource corresponding to the style are individually developed and manufactured. Accordingly, because the simulation-based style transfer requires investments of time, manpower, and costs for each development of a new style, there is a limit in the extension of a style and the diversification of types of a style.

When style transfer is performed through AI, compared with the simulation-based style transfer, much more unique images may be generated. Furthermore, by increasing creativity, artistic quality of an image may be increased, and an image that further matches the needs of a user who does not want a general image may be generated. Furthermore, for the AI-based style transfer, there is no need to individually develop texture image or image resource corresponding to each style as in the simulation-based style transfer. In other words, in the AI-based style transfer, when an original image and an image having a style to copy are input to an input end of the neural network, an image transferred to a certain style through an operation in the neural network is output.

However, the time for performing an AI-based style transfer operation may be greater than the time for performing the simulation-based style transfer. For example, the simulation-based style transfer may output a style transferred image in real time. On the other hand, for the style transfer using AI, tens of seconds to several minutes may be spent for performing style transfer on an input image and outputting a style transferred image. While an AI-based style transferred image that is a last resultant is generated, a general display apparatus may output a preset standby screen or a screen indicating that processing is being performed, for example, a UI screen indicating the message "processing". Accordingly, for the style transfer using AI, a user may not have instant feedback regarding a generated image because that tens of seconds to several minutes may be spent for performing AI style transfer. Therefore, the user may feel bored during the time until an AI-based style transferred image is output.

The user generally desires to have a desired image to be rapidly output, and when a time for outputting a style transferred image takes long, the user may feel further bored. Furthermore, when an output of a style transferred image is delayed, the user may incorrectly believe that an error has occurred in the performing of style transfer operation.

Accordingly, according to an embodiment of the disclosure, a display apparatus which may prevent and/or reduce a user from feeling bored using an image generated through the simulation-based style transfer during the time it takes for an AI-based style transferred image that further matches user needs is output, and a control method of the display apparatus are provided. Furthermore, in an embodiment of the disclosure, when the generation of an AI-based style transferred image is completed, by performing image transition from the already output image, for example, an image generated through the simulation-based style transfer to an AI-based style transferred image, the user at least may see the AI-based style transferred image. Accordingly, the user may finally watch an AI-based style transferred image that is transferred to a unique style with high artistic quality. Also, the user may not feel bored by watching a simulation-based style transferred image that is rapidly output during the time until the generation of an AI-based style transferred image is completed.

In the following description, a display apparatus according to an embodiment of the disclosure and a method of controlling the display apparatus are described in greater detail below with reference to FIGS. 3 to 15.

Figure 3:
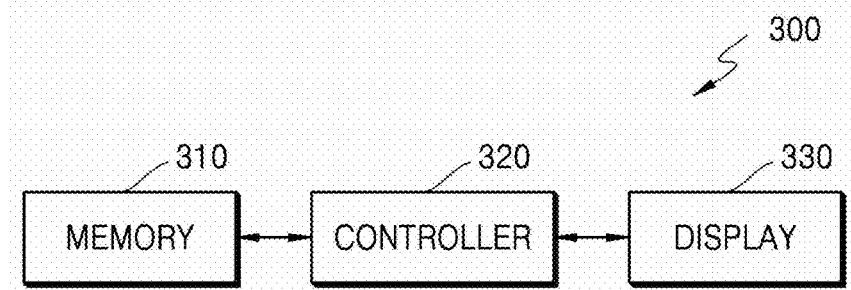
FIG. 3 is a block diagram illustrating an example display apparatus according to an embodiment of the disclosure.

FIG. 3 is a block diagram illustrating an example display apparatus 300 according to an example embodiment of the disclosure.

Referring to FIG. 3, the display apparatus 300 may include a memory 310, a controller (e.g., including processing circuitry) 320, and a display 330.

The memory 310 may store at least one instruction.

The at least one instruction stored in the memory 310 may be executed by a processor included in the controller 320.

Furthermore, the memory 310 may include a storage medium having at least one type of, for example, and without limitation, flash memory, hard disk, multimedia card micro type, card type, for example, SD or XD memory, random access memory (RAM), static random access memory (SRAM), read-only memory (ROM), electrically erasable programmable read-only memory (EEPROM), programmable read-only memory (PROM), magnetic memory, magnetic disks, optical disks, etc.

The controller 320 may include various processing circuitry, including at least one processor that executes the at least one instruction.

In this regard, each of the at least one processor may perform a certain operation by executing the at least one instruction stored in the memory 310.

Furthermore, each of the at least one processor may perform a certain operation by executing at least one instruction stored in the controller 320.

Furthermore, the at least one processor included in the controller 320 may control operations performed in the display apparatus 300 and may control other elements included in the display apparatus 300 to have a certain operation performed. Accordingly, when the controller 320 is described, for example, as one controlling certain operations, it is apparent that the at least one processor included in the controller 320 controls certain operations.

Furthermore, the controller 320 may include an internal memory and the at least one processor that executes at least one program that is stored. For example, the internal memory of the controller 320 may store at least one instruction. The at least one processor included in the controller 320 may perform a certain operation by executing the at least one instruction stored in the internal memory of the controller 320 to, for example, control operations of the display apparatus 300.

For example, the controller 320 may include RAM (not shown) that stores a signal or data input from the outside of the display apparatus 300 or is used as a storage area corresponding to various works performed in the display apparatus 300, ROM (not shown) that stores a control program and/or a plurality of instructions for controlling the display apparatus 300, and the at least one processor. The processor may include a graphics processing unit (GPU) (not shown) for processing graphics corresponding to a video. The processor may be implemented by a system-on-chip (SoC) integrating a core (not shown) and a GPU (not shown). The processor may include a single core, a dual core, a triple core, a quad core, and a multiple core thereof.

In the following description, for convenience and ease of explanation, a case in which, when the controller 320 performs or controls a certain operation, the processor of the controller 320 performs a certain operation by executing at least one instruction stored in the memory 310 is described as an example, but the disclosure is not limited thereto.

The display 330 outputs an image. For example, the display 330 may output an image corresponding to video data through a display panel (not shown) that is internally included, so that a user may visually recognize the video data.

In an embodiment of the disclosure, the display 330, under the control of the controller 320, displays at least one second image and sequentially displays a third image according to image transition.

In the following description, operations performed by respective elements included in the display apparatus 300 are described in greater detail below with reference to FIG. 4.

Figure 4:
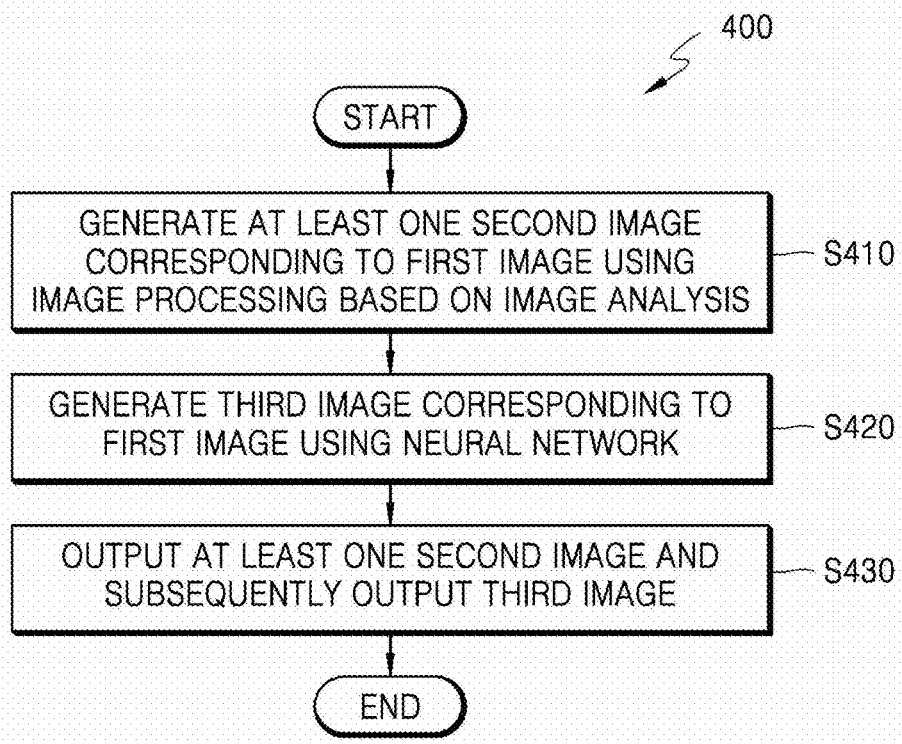
FIG. 4 is a flowchart illustrating an example method of controlling a display apparatus, according to an embodiment of the disclosure.

FIG. 4 is a flowchart illustrating an example method 400 of controlling a display apparatus, according to an embodiment of the disclosure. Furthermore, FIG. 4 is a flowchart illustrating example operations performed in the display apparatus 300 according to an embodiment of the disclosure.

Referring to FIG. 4, the method 400 of a display apparatus, for example, the display apparatus 300 of FIG. 3, may include operation S410, operation S420, and operation S430.

Referring to FIGS. 3 and 4, in an embodiment of the disclosure, the controller 320 controls generation of at least one second image that is style transferred by image processing a first image based on a result of analyzing the first image so that the first image has a first style corresponding to a certain texture (S410). The first image may signify an original image subject to style transfer. For example, the first image may include, for example, and without limitation, an image received by the display apparatus 300, an image that the display apparatus 300 has already stored, an image that a user inputs for style transfer, an image that an external apparatus (not shown) transmits for style transfer, or the like.

Furthermore, the controller 320 controls generation of a third image by performing an operation for style transfer of the first image using the neural network (S420).

Although, in the flowchart of FIG. 4, after operation S410 is performed, operation S420 is performed, the operations S410 and S420 may be simultaneously performed. Operations S410 and S420 may be performed in parallel at the same time or at adjacent time points.

For example, when a user input corresponding to a style transfer request is received, the controller 320 may perform operations S410 and S420 in parallel. In another example, when the first image that is the original image subject to style transfer is received, the controller 320 may perform operations S410 and S420 in parallel.

The controller 320 controls outputting of at least one second image and sequentially a third image on the display 330 (S430). For example, the controller 320 may control displaying the at least one second image, and finally displaying the third image through image transition from a last output image of the at least one second image to the third image.

The first image may be the original image subject to style transfer. Furthermore, the above-described simulation-based style transfer generates a resultant, for example, a style transferred image, by analyzing an input image and performing image processing on an analyzed image using a previously manufactured texture image or image resource. Accordingly, "performing style transfer by analyzing an image and performing image processing based on a result of analysis" may refer, for example, to the above-described "simulation-based style transfer". In other words, when transferring a style of the first image that is the original image, the controller 320 may control generation of the at least one second image by performing a simulation-based style transfer, and generation of the third image by performing an AI-based style transfer.

Furthermore, the controller 320 may simultaneously and parallelly perform a simulation-based style transfer that is an operation of generating the at least one second image and an AI-based style transfer operation that is an operation of generating the third image. In this example, performing of an AI-based style transfer may take from tens of seconds to several minutes. Accordingly, before the generation of the third image is completed, at least one second image may be displayed. Because the simulation-based style transfer operation is capable of real-time feedback, at least one image, for example, at least one second image, generated in a process of performing style transfer may be output in real time.

In an embodiment of the disclosure, the user may finally watch a third image that is an AI-based style transferred image that has high artistic quality and is transferred to a unique style, and may not feel bored by watching a simulation-based style transferred image that is rapidly output during the time until the generation of an AI-based style transferred image, for example, the third image, is completed. Accordingly, according to an embodiment of the disclosure, as the user may watch an image having a unique style, that is, an AI-based style transferred image, for example, the third image, without feeling bored, during the time until the image is style transferred and generated, user need may be met and user convenience may be increased.

According to the embodiment of the disclosure illustrated in FIGS. 3 and 4, as a user may watch an image having a unique style, for example, a third image that is AI-based style transferred, without feeling bored during the time until an image is generated through style transfer, user satisfaction and user convenience may be increased.

Figure 5:
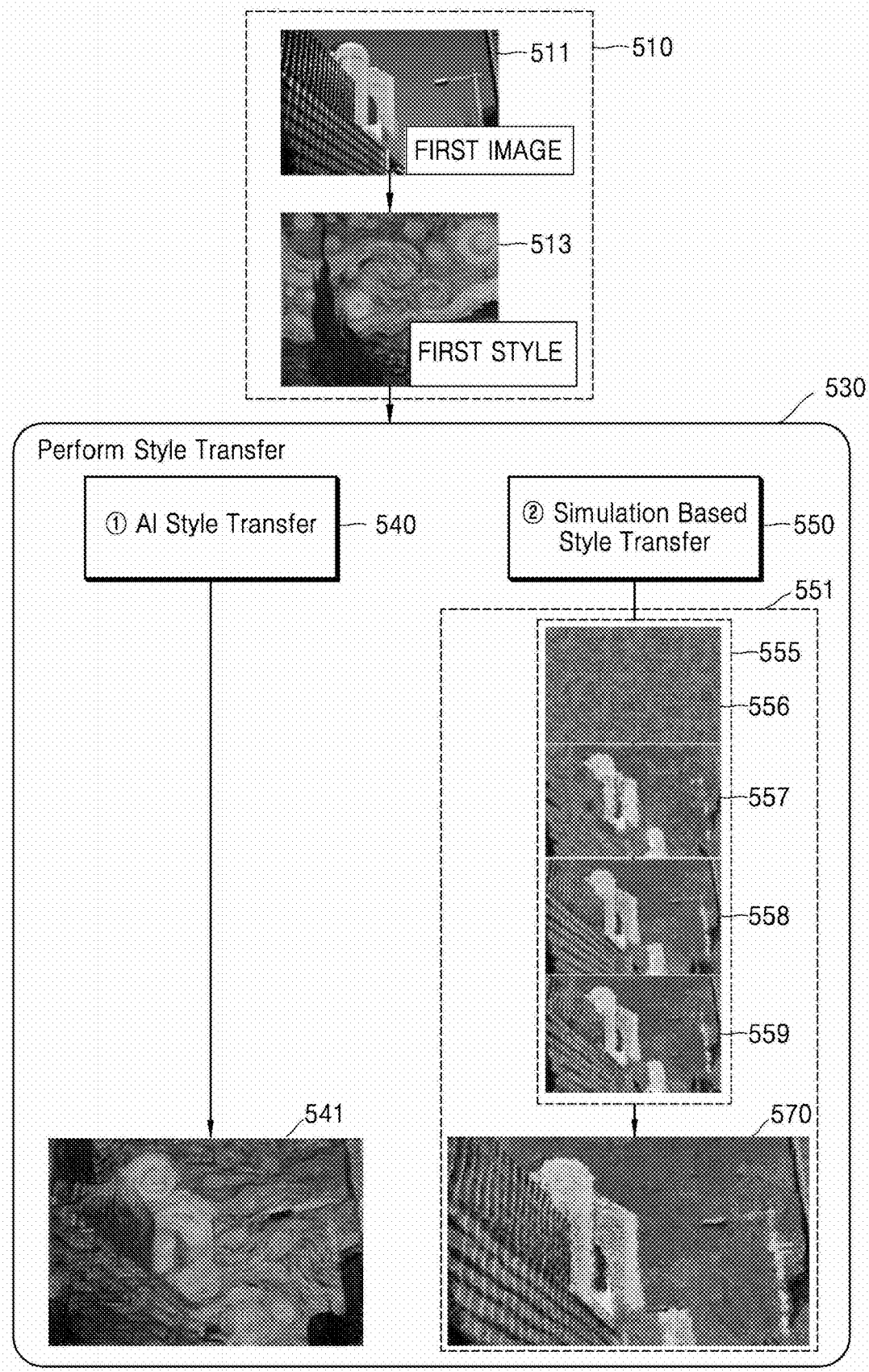
FIG. 5 is a diagram illustrating an example style transfer operation according to an embodiment of the disclosure.

FIG. 5 is a diagram illustrating an example style transfer operation according to an example embodiment of the disclosure. For example, the controller 320 may perform the style transfer operation illustrated in FIG. 5.

The controller 320 may obtain a first image 511 and may set a first style 513 that is a style to be transferred. The first style 513 may be set according to a user's selection. An operation of setting or determining the first style corresponding to the user's selection is described in greater detail below with reference to FIG. 13.

Figure 13:
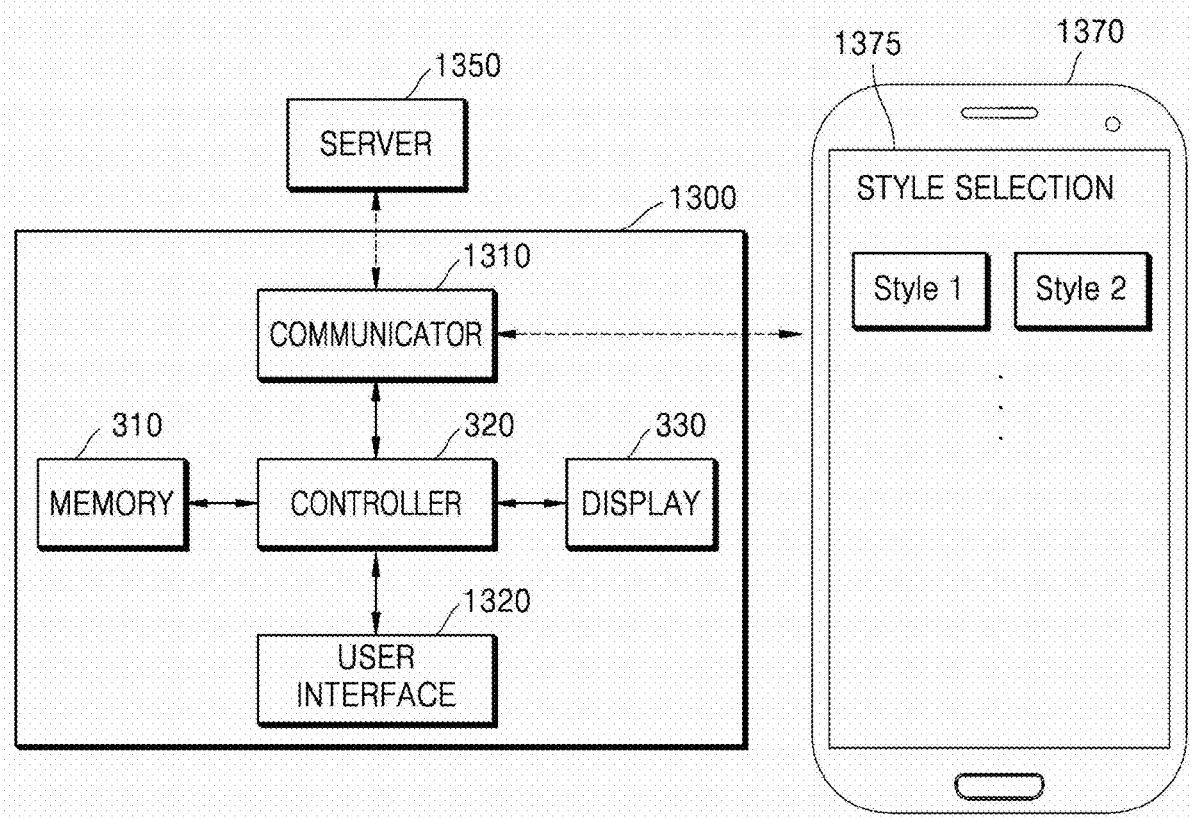
FIG. 13 is a block diagram illustrating an example display apparatus according to another embodiment of the disclosure.

FIG. 13 is a block diagram illustrating an example display apparatus 1300 according to another example embodiment of the disclosure. The display apparatus 1300 illustrated in FIG. 13 may correspond to the display apparatus 300 illustrated in FIG. 3. Furthermore, in FIG. 13, the same elements as those in FIG. 3 are illustrated using the same reference numerals. Accordingly, in the description of the display apparatus 1300, descriptions redundant with those of the display apparatus 300 may not be repeated here.

Referring to FIG. 13, the display apparatus 1300 may further include at least one of a communicator (e.g., including communication circuitry) 1310 and/or a user interface (e.g., including user interface circuitry) 1320, compared with the display apparatus 300.

The communicator 1310, under the control of the controller 320, may include various communication circuitry and transceive data with respect to at least one external apparatus via a communication network. The external apparatus may include a server 1350, a mobile device 1370, or an electronic apparatus (not shown) for performing image processing, but the disclosure is not limited thereto.

The server 1350 may perform an operation according to the neural network. For example, the server 1350 may perform an AI-based style transfer on a first image subject to style transfer to generate a third image. For example, the server 1350 may receive a first image through the communicator 1310 of the display apparatus 1300, perform an operation according to the neural network, and transfer a style of the first image, thereby generating a third image. Also, the server 1350 may transmit the generated third image to the communicator 1310 of the display apparatus 1300.

The mobile device 1370 may include a mobile computing device such as, for example, and without limitation, wearable devices, smart phones, tablet PCs, PDAs, laptop computers, media players, microservers, global positioning system (GPS) devices, or the like.

For example, the mobile device 1370 and the display apparatus 1300 may be connected with each other through a home Internet of things (Home IoT) platform, or the like. Furthermore, the mobile device 1370 may be an electronic apparatus that is paired with the display apparatus 1300 via a wireless network.

For example, the mobile device 1370 may remotely control the display apparatus 1300. Furthermore, the mobile device 1370 may transceive data with respect to the display apparatus 1300 so that the display apparatus 1300 may perform a certain service or a certain operation.

The display apparatus 1300 may operate under the control of the mobile device 1370. For example, the display apparatus 1300 may recognize the location of the mobile device 1370 and automatically perform a certain service, for example, an ambient service, or a certain operation. In another example, the display apparatus 1300 may perform style transfer operation at the request or under the control of the mobile device 1370.

The user interface 1320 may receive a user input for controlling the display apparatus 1300. The user interface 1320 may include various user interface circuitry, including a user input device including, for example, and without limitation, a touch panel for sensing a user's touch, a button for receiving a user's push operation, a wheel that receives a user's rotation manipulation, a key board, a dome switch, but the disclosure is not limited thereto.

Furthermore, the user interface 1320 may include a voice recognition apparatus (not shown) for voice recognition. For example, the voice recognition apparatus may be a microphone, and the voice recognition apparatus may receive a user's voice command or a voice request. Accordingly, the controller 320 may control an operation corresponding to a voice command or a voice request to be performed.

Furthermore, the user interface 1320 may include a motion detection sensor (not shown). For example, the motion detection sensor may detect a motion of the display apparatus 1300 and may receive a detected motion as a user's input. Furthermore, the above-described voice recognition apparatus and motion detection sensor may be included in the display apparatus 1300, not in the user interface 1320, but as a module independent of the user interface 1320.

Referring to FIG. 5, an example in which the first style is a style corresponding to a painting work of a specific painter is illustrated. For example, in FIG. 5, a first style 513 may refer to Van Gogh's "Starry Night" itself or a Van Gogh's style.

In the following description, a style transfer operation according to an example embodiment of the disclosure is described in greater detail with reference to FIGS. 5, 6, and 13.

Figure 6:
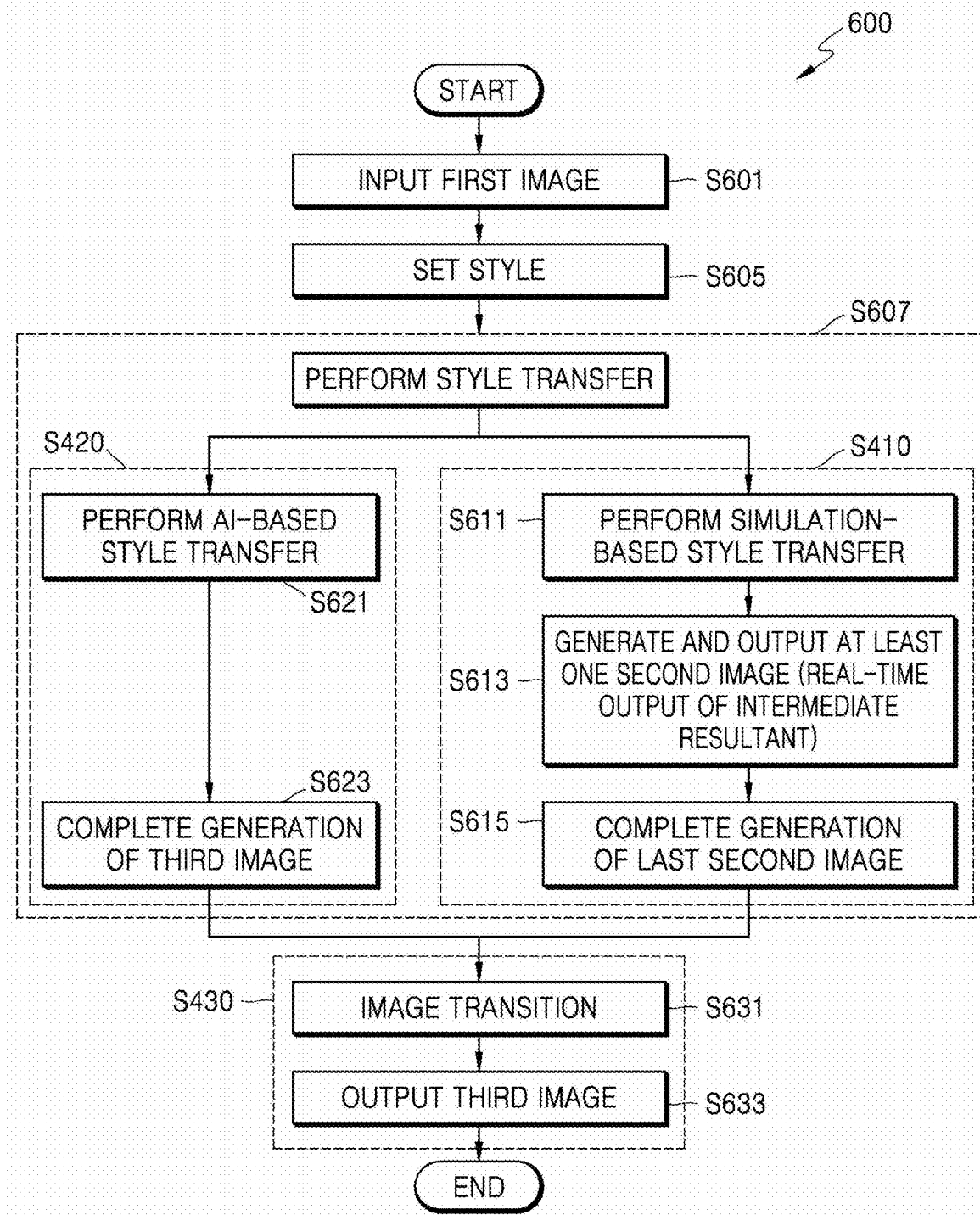
FIG. 6 is a flowchart illustrating an example method of controlling a display apparatus, according to an embodiment of the disclosure.

FIG. 6 is a flowchart illustrating an example method of controlling a display apparatus, according to an example embodiment of the disclosure. Furthermore, FIG. 6 is a flowchart illustrating an example operation performed in the display apparatus 300 or 1300 according to an example embodiment of the disclosure. In FIG. 6, the same elements as those in FIG. 4 are illustrated using the same reference numerals. Accordingly, in the description of an example embodiment of the disclosure illustrated in FIG. 6, descriptions redundant with those in FIG. 4 may not be repeated with respect to FIG. 6.

For example, in order to perform style transfer, a first image that is an original image is input (S601), and a first style to be applied to the first image is determined (S605).

The first style may be set or selected to be any one of one or more styles (S605).

For example, the first style 513 may be determined by the default setting of the controller 320 or the display apparatus 1300. In other words, the first style 513 may be a preset style. For example, in the initial setting of the display apparatus 1300, a user may set the first style considering the user's taste, painting style, and/or favorite painter or work. Before the user changes the first style, the controller 320 may set the first style to a particular style according to the user's initial setting. Furthermore, when there is no users initial setting, the controller 320 may set the first style to a particular style according to the default setting.

Furthermore, the first style 513 may be determined based on the user's input through the user interface 1320 of the display apparatus 1300. For example, the controller 320 of the display apparatus 1300 may control the display apparatus 1300 to output a user interface screen (not shown) for selecting any one of a plurality of available styles. The user may select any one of the styles as the first style through the user interface screen. The controller 320 may perform style transfer on the first image 511 according to the first style based on the user's input to select the first style.

In another example, the controller 320 may determine the first style based on the user's input to the external apparatus connected to the display apparatus 1300 through the communication network. For example, the controller 320 may determine the first style based on the user's input through the mobile device 1370 that operates by being paired with the display apparatus 1300. In this example, the mobile device 1370 may output a user interface screen 1375 to select any of a plurality of styles to be usable by the display apparatus 1300. The user may select a first style, for example, "style 1", through the user interface screen 1375 output by the mobile device 1370. The mobile device 1370 may transmit information indicating the first style selected based on the user's input to the communicator 1310 of the display apparatus 1300. The communicator 1310 may transmit to the controller 320 the received information indicating that the first style is selected. Accordingly, the controller 320 may perform style transfer on the first image 511 according to the first style.

Referring to FIGS. 5 and 13, the controller 320 may perform style transfer on the first image 511 based on Van Gogh's "Starry Night" that is the first style.

In order to perform style transfer on the input first image to the first style, the controller 320 may perform an AI-based style transfer 540 and a simulation-based style transfer 550 (S607).

The operation of the AI-based style transfer 540 is described below in greater detail with reference to FIGS. 7, 8, and 9.

For example, the controller 320 may perform an operation for style transfer of the first image 511 through the neural network (e.g., AI-based) (S621), and control generation of a third image 541 corresponding to the first style 513 (S623).

Furthermore, the controller 320 may perform the simulation-based style transfer 550 (S611) to control generation of at least one second image (S613 and S615). Herein, at least one image (556, 557, 558, 559, and 570) generated by the simulation-based style transfer is referred to as "second image". For example, the controller 320 may control generation and output of at least one second image that is gradually changed in a process of performing image processing so that the first image 511 has the first style 513 (S613). The above-described at least one second image 511 may include second images 556, 557, 558, and 559 and an image 570 illustrated in FIG. 5.

For example, when the controller 320 performs the simulation-based style transfer 550, an intermediate resultant 555 may be generated and output in real time during the process in which the first image is style transferred. In this state, the intermediate resultant 555 may include the second images 556, 557, 558, and 559 that show a degree of progress of the style transfer though the style transfer is not completed.

For example, the controller 320 may perform a simulation-based style transfer on the first image 511 based on edge information of the first image 511 so that the first image 511 may have a certain texture, and generate at least one of the second images 556, 557, 558, 559, and 570.

For example, the simulation-based style transfer 550 may perform analysis on the shape of an image through image processing with respect to the first image 511 that is the original image.

For example, the simulation-based style transfer 550 may be performed through the following processes. For example, an image analysis method may include a method of extracting edges of features in an image by obtaining a gradient of the image. A portion to be drawn with relatively large texture and a portion to be repeatedly drawn with a relatively small texture as edges are finely arranged in an image may be defined based on the extracted edges. The first image may be transferred to the first style that is a desired style by repeatedly drawing texture prepared according to the defined portion or region.

In other words, the controller 320 may extract the edge of feature of an image by analyzing the first image 511 and repeatedly draw a certain texture based on the extracted edges, thereby performing style transfer. As the simulation-based style transfer operation progresses, the texture of the image may be expressed further finely. For example, the second image 556, the second image 557, the second image 558, the second image 559, and the image 570 may be sequentially generated in the process of performing the simulation-based style transfer 550. The controller 320 may generate the image 570 as a last resultant of the simulation-based style transfer 550 (S615).

The operation of the simulation-based style transfer 550 is described below in greater detail with reference to FIG. 10.

Furthermore, the controller 320 controls at least one of the second image 556, 557, 558, 559, or 570 to be sequentially output on the display 330 according to the generation order of at least one of the second images 556, 557, 558, 559, and 570. Screens output on the display 330 may be described below in greater detail with reference to FIG. 7.

As described above, the time for performing the operation of the AI-based style transfer 540 is greater than the time for performing the operation of the simulation-based style transfer 550. Furthermore, the operation of the AI-based style transfer 540 may not be able to output the intermediate resultant 555 as in the operation of the simulation-based style transfer 550, and may output only the third image 541 that is the last resultant. Accordingly, assuming that the AI-based style transfer 540 and the simulation-based style transfer 550 are performed simultaneously and parallelly, the time for completing the generation of the third image 541 may be greater than the time for completing the generation of at least one of the second images 556, 557, 558, 559, and 570. Accordingly, the display apparatus 300 or 1300 according to an embodiment of the disclosure may output the third image 541 after outputting on the display 330 at least one of the second images 556, 557, 558, 559, and 570.

For example, the controller 320 may perform image transition such that the third image 541 may be output after at least one of the second images 556, 557, 558, 559, and 570 that are gradually changed are sequentially output on the display 330 (S631 and S633).

The screen output on the display 330 according to the image transition operation (S631) is described below in greater detail with reference to FIG. 11.

According to an embodiment of the disclosure in which the operations illustrated in FIGS. 5 and 6 are performed, a simulation-based style transfer operation and an AI-based style transfer operation may be performed in parallel, and thus at least one of second images that are gradually changed through the simulation-based style transfer are sequentially output, and a third image that is AI-based style transferred may be output. Accordingly, during the time spent for generating an AI-based style transferred image, a user may not feel bored by watching simulation-based style transferred images.

Furthermore, by finally watching an AI-based style transferred image, a user may watch a highly creative and artistic image.

FIG. 7 is a diagram illustrating an example style transfer operation through a neural network according to an example embodiment of the disclosure. In other words, FIG. 7 is a diagram illustrating an example AI-based style transfer operation.

Referring to FIG. 7, an original image 710, a style 720, and a transferred image 730 respectively correspond to the first image 511, the first style 513, and the third image 541 described in FIG. 5.

When the original image 710 and the style 720 are input to the neural network, the neural network performs an internal operation to transfer the original image 710 according to the style 720 and generate the transferred image 730.

In an embodiment of the disclosure, the neural network is used to generate the third image. For example, the AI-based style transfer 540 of FIG. 5 is a method that classifies the original image 710 into a content image and a style image and transfers the style of the style image to the style 720 subject to a transfer while keeping the content of the content image. For example, there is a method using a convolution neural network (CNN) entitled "A Neural Algorithm of Artistic Style". For example, in a layer of the neural network, the transferred image 730 is generated by reconstructing the style and the content in the feature map using the extracted feature map style.

In an embodiment of the disclosure, the neural network performs an image generation operation according to the AI technology. For example, the neural network may be a deep neural network (DNN) that performs an operation through a plurality of layers. The neural network may be classified into DNN according to the number of internal layers performing an operation, when the number of layers is plural, that is, the depth of the neural network performing the operation increases. Furthermore, the DNN operation may include a CNN operation.

The neural network used to generate the third image may be a trained neural network to obtain an intended result.

For example, the neural network may implement a recognition model to classify or recognize a content image in the original image 710, and the implemented recognition model may be trained using training data. The neural network is trained by repeatedly performing the above-described training, and a plurality of weights applied to each of a plurality of nodes forming the neural network may be set. The weight may signify connection strength between the respective nodes forming the neural network. The weight value may be optimized through repeated training, and may be repeatedly corrected until the accuracy of a result satisfies a certain degree of reliability. The neural network used in an embodiment of the disclosure may be a neural network formed of weight values finally set through the above-described training process.

Content included in the original image 710 may be classified or extracted by analyzing or classifying the original image 710 that is input data, using a trained recognition model forming the neural network. The transferred image 730 may be generated by applying the style 720 to a content image corresponding to the extracted content. The transferred image 730 may include the extracted content and may be an image having the style 720. Referring to FIG. 7, the original image 710 represents buildings following the medieval European architectural style and adjacent rivers thereto. The neural network may generate the transferred image 730 by performing an operation to allow the image to be represented with a painting style of Van Gogh's "Starry Night" corresponding to the style 720 that is set while keeping "the medieval European architectural style and adjacent rivers thereto" that is the content included in the original image 710.

In an embodiment of the disclosure, the operation of generation of the third image through the neural network may be performed in the external apparatus that transceives data with the display apparatus 300 through a communication network.

For example, the communicator 1310 may communicate with the external apparatus, for example, the server 1350, which performs an operation for style transfer through the neural network. The controller 320 may control the external apparatus, for example, the server 1350, to receive the third image obtained by performing an operation through the neural network. In order to perform style transfer through the neural network, as described above, a trained neural network that is trained by repeatedly performing a training process is necessary. Many operation processes are performed until a trained neural network is generated. Accordingly, to establish a neural network with high perfection, a processor having a large data processing capacity and a fast data processing speed is necessary. Accordingly, in the present example embodiment of the disclosure, the third image may be obtained through the server 1350 that rapidly and accurately performs the AI-based style transfer.

For example, the controller 320 may transmit the original image 710 and the style 720 to the server 1350 through the communicator 1310, and request style transfer of the original image 710 from the server 1350. Accordingly, the server 1350 may transfer the style of the original image 710 to generate the transferred image 730, and transmit the generated transferred image 730 to the communicator 1310 of the display apparatus 1300.

Furthermore, the controller 320 may establish a neural network for performing style transfer in the controller 320 or the memory 310, and perform the AI-based style transfer operation to generate the third image through the established neural network. Furthermore, according to an example embodiment of the disclosure, a neural network for performing style transfer may be established as a separate processor.

Figure 8:
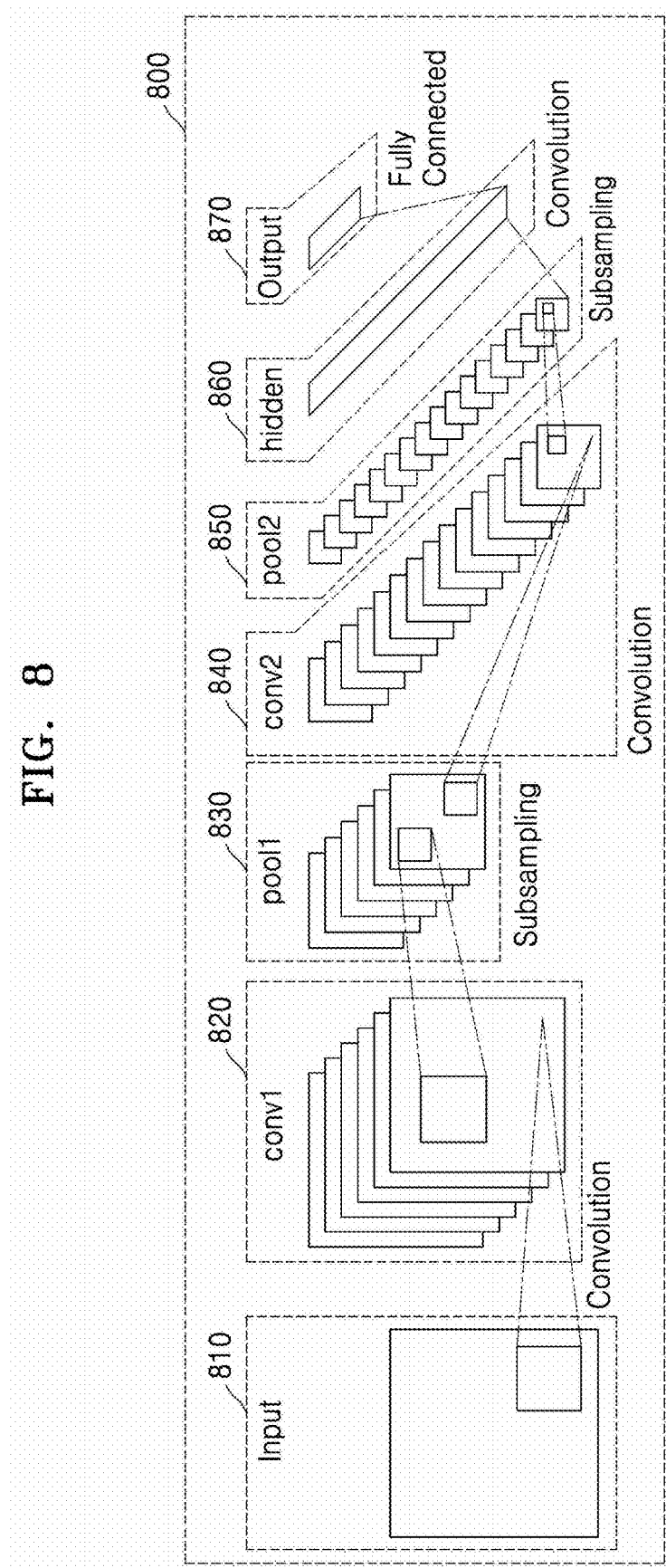
FIG. 8 is a diagram illustrating an example neural network used for style transfer according to an embodiment of the disclosure.

FIG. 8 is a diagram illustrating an example neural network used for style transfer according to an example embodiment of the disclosure. Referring to FIG. 8, a neural network used in an example embodiment of the disclosure is illustrated as an example.

In an embodiment of the disclosure, the controller 320 may control generation of the third image using, for example, and without limitation, a CNN, a deep convolution neural network (DCNN), a Capsnet neural network (not shown), or the like. A Capsnet neural network may be developed to compensate for the weakness of CNN. Furthermore, all of CNN, DCNN, and Capsnet may be CNN based neural networks.

When a correlation between pieces of information included in an image is local, a CNN based neural network may introduce a concept of a filter corresponding a specific partial area included in the image and generate a new feature or representation by convoluting the pieces of information in the filter.

FIG. 8 illustrates a CNN based neural network 800. For example, in FIG. 8, a DCNN including a plurality of layers and thus having a plurality of depths is shown as the CNN based neural network 800.

Referring to FIG. 8, the controller 320 may control generation of the transferred image 730 that is the third image through the CNN based neural network 800.

Referring to FIG. 8, in the CNN based neural network 800, convolution layers and pooling layers are alternately arranged, and the depth of each layer filter increases from left to right. Furthermore, the last layer of the CNN based neural network 800 may be formed by a fully connected layer. A convolution layer may refer, for example, to a layer of pieces of data generated according to a convolution operation, and a pooling layer may refer, for example, to a layer for decreasing the number or size of data through a subsampling or pooling operation. As the input image 810 passes through the convolution layer and the pooling layer, pieces of data, for example, a feature map, indicating a feature of an input image are generated. The pieces of data generated by passing through the convolution layer and the pooling layer are processed through a hidden layer to be formed as a fully connected layer, and then a "third image" that is data having a new feature or representation may be generated.

For example, the CNN based neural network 800 may include an input layer 810, a first convolution layer 820, a first pooling layer 830, a second convolution layer 840, a second pooling layer 850, a hidden layer 860, and an output layer 870. The depth of the convolution layer and the pooling layer may be variable, and the depth of the hidden layer may be variable. Furthermore, as the depth of the convolution layer and the pooling layer increases, more diverse pieces of data may be generated. For example, as the depth of the convolution layer and the pooling layer increases, pieces of information indicating features of an input image may represent more detailed features of the input image. Furthermore, the depth and shape of the CNN based neural network 800 may be designed very diversely considering accuracy of a result, reliability of a result, or an operation processing speed and capacity of a processor.

Figure 9:
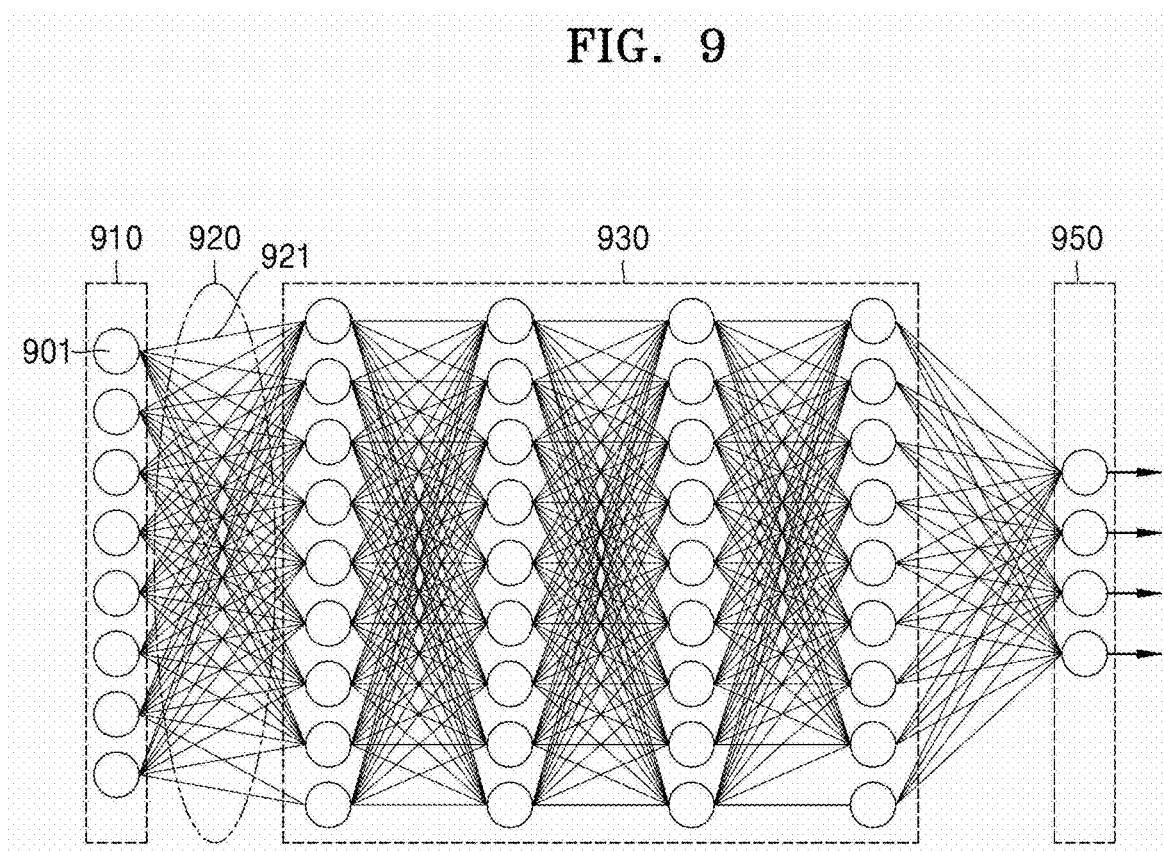
FIG. 9 is another diagram illustrating an example neural network used for style transfer according to an embodiment of the disclosure.

FIG. 9 is another diagram illustrating an example neural network used for style transfer. FIG. 9 is a diagram illustrating an example of DNN in which the hidden layer has three depths. In FIG. 9, blocks 910 and 930 may correspond to the hidden layer 860 of FIG. 8, which is formed as a fully connected layer, and a block 950 may correspond to the output layer 870 of FIG. 8.

The neural network illustrated in FIG. 9 may include an input layer 910, a hidden layer 930, and an output layer 950. The input layer 910 may refer, for example, to a layer receiving an input of pieces of data output from the second pooling layer 850 of FIG. 8, the hidden layer 930 may refer, for example, to a layer processing the input pieces of data, and the output layer 950 may refer, for example, to a layer outputting pieces of data that are processed by passing through the hidden layer 930.

Furthermore, each of a plurality of layers forming the neural network illustrated in FIG. 9 may include one or more nodes. For example, the input layer 910 may include one or more nodes, for example, a node 901, receiving data. Furthermore, a case in which the input layer 910 includes a plurality of nodes is illustrated. The subsampled images may be input to each of the nodes forming the input layer 910, through a pooling operation.

Two adjacent layers, as illustrated in the drawing, are connected to a plurality of edges 920, for example, an edge 921. Each node may have a weight value corresponding thereto, and thus the neural network illustrated in FIG. 9 may obtain output data based on a value obtained by operating an input signal and a weight value, for example, through a convolution operation.

When the neural network illustrated in FIG. 9 is trained to generate style transferred image by transferring the style of an image, the neural network illustrated in FIG. 9 may output the transferred image 730 to have the style 720 that is set.

The neural network that performs an operation for AI-based style transfer described with reference to FIGS. 7, 8 and 9 may be referred to as an AI based image generation model, and the AI based image generation model may be implemented by software and/or hardware. The neural network that is the AI based image generation model may be formed in the display apparatus 1300 as described above, and may be formed in the external apparatus, for example, the server 1350, that is connected to the display apparatus 1300 through a communication network.

Figure 10:
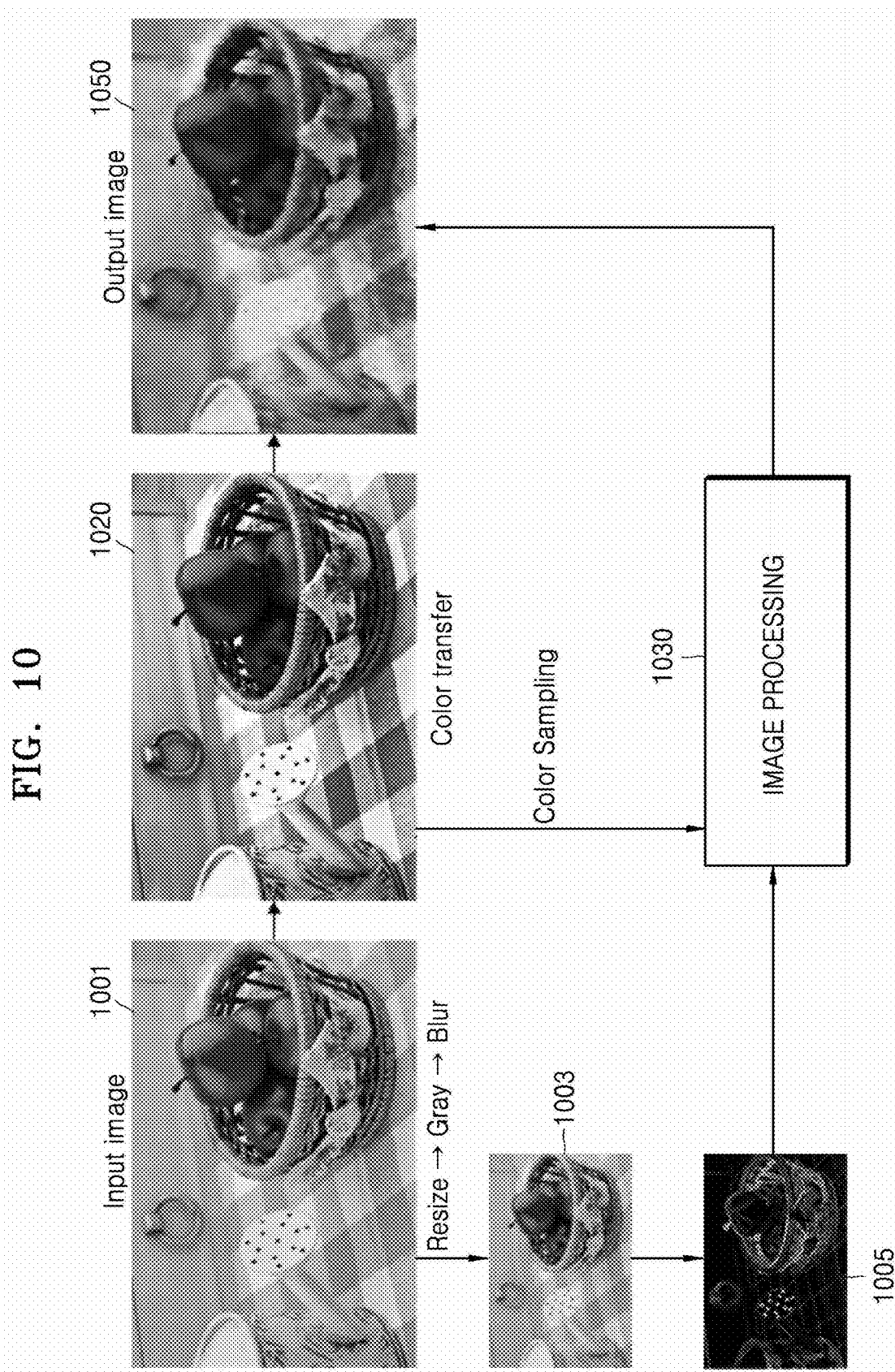
FIG. 10 is diagram illustrating example simulation-based style transfer operations according to an embodiment of the disclosure.

FIG. 10 is a diagram illustrating example simulation-based style transfer operations according to an example embodiment of the disclosure.

The display apparatus 1300 according to an embodiment of the disclosure may perform a simulation-based style transfer operation. For example, a configuration performing a simulation-based style transfer may, for example, be referred to as a "photo filter". For example, the controller 320 may perform a simulation-based style transfer and may include a first photo filter corresponding to the first style. The controller 320 may control performing of a simulation-based style transfer using the first photo filter stored in the memory 310. The display apparatus 1300 may include the first photo filter as a separate configuration, and control performing of a simulation-based style transfer using the first photo filter under the control of the controller 320.

Furthermore, the display apparatus 1300 may include a plurality of photo filters corresponding to each of a plurality of styles. A photo filter corresponding to the first style among a plurality of photo filters may, for example, be referred to as the first photo filter. Furthermore, when a style to be applied to style transfer is added or developed, the controller 320 may additionally install a photo filter corresponding to the added or developed style.

The controller 320 may, for example, control generation of at least one of the second images 556, 557, 558, 559, and 570 using the first photo filter.

Furthermore, when receiving a user's input of selecting a first style that is any one of a plurality of different styles, the controller 320 may control generation of at least one second image by performing image processing using the first photo filter so that the first image has the first style, at least one second image. The user's input may be received, as described in FIG. 13, through the user interface 1320 or the mobile device 1370.

FIG. 10 is a diagram illustrating an example style transfer operation performed by a photo filter according to an example embodiment of the disclosure. Referring to FIG. 10, the controller 320 may adjust the size of an original image 1001 that is an input image and change the color thereof to black and white, thereby generating a size and color adjusted image 1003, and may calculate gradient and/or edge density by analyzing the size and color adjusted image 1003, thereby obtaining an edge image 1005. The controller 320 may generate an image 1020 by changing the color of the original image 1001 to correspond to a set style. Style transferred image 1050 may be generated through image processing 1030 by repeatedly drawing previously prepared texture on the image 1020 that is color changed. For example, the style transferred image 1050 may be generated by performing image processing to change, for example, and without limitation, at least one of color, size, direction, texture, brightness, saturation, or the like, of the image 1020 based on the edge image 1005.

The photo filter may perform the above style transfer operation in real time and generate style transferred image in a few seconds, and may immediately output intermediate resultants in a process of performing style transfer operation. Accordingly, the display apparatus 1300 may display in real time intermediate resultants and at least one second image that is a last resultant, which are generated through a simulation-based style transfer operation. Accordingly, the user may watch interesting images without feeling bored by watching in real time images that are sequentially style transferred.

Figure 11:
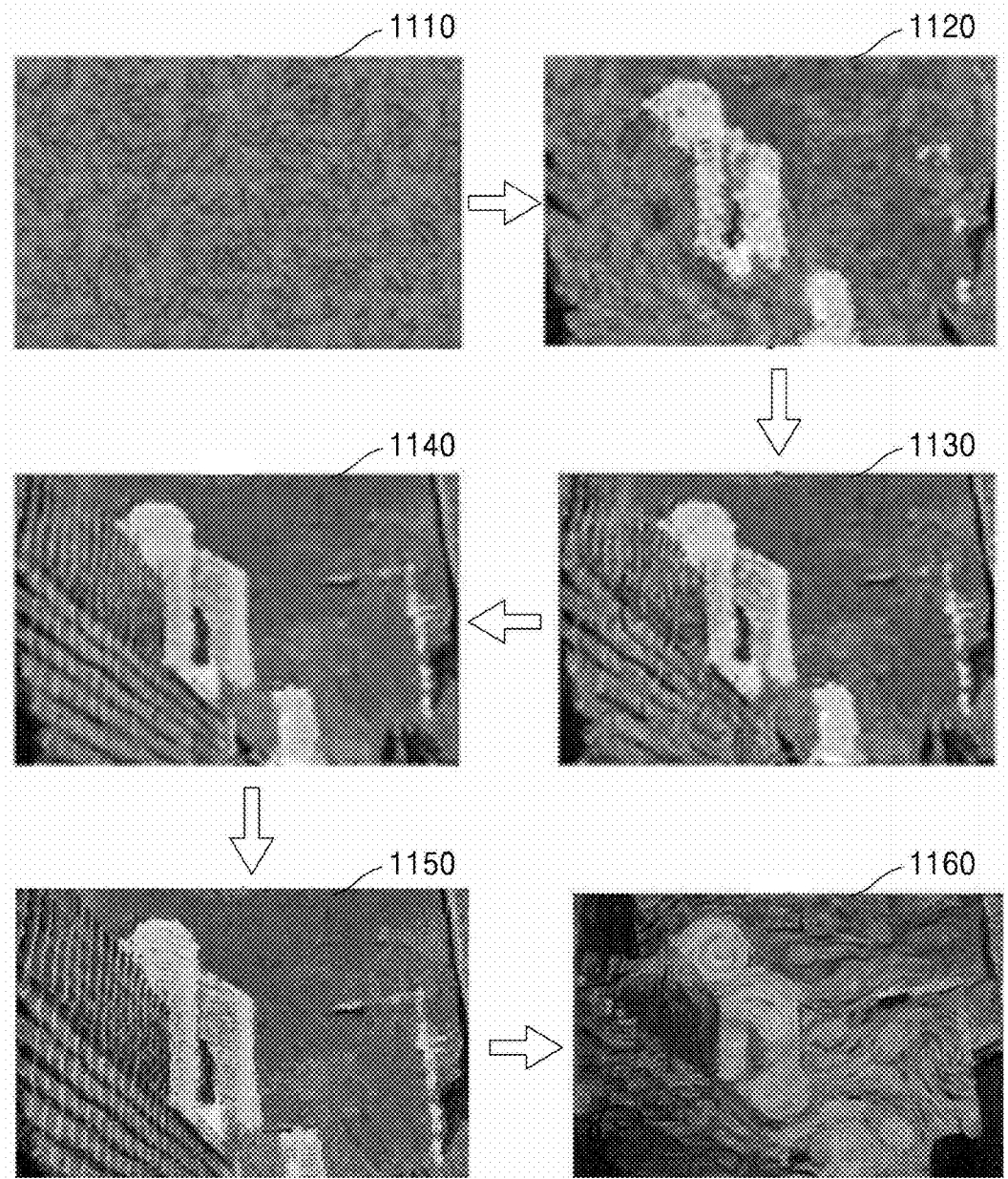
FIG. 11 is diagram illustrating example images output from a display apparatus according to an embodiment of the disclosure.

FIG. 11 is diagram illustrating example images output from a display apparatus according to an example embodiment of the disclosure. In FIG. 11, at least one second image that is one of images to be generated through a simulation-based style transfer may include an image 1110, an image 1120, an image 1130, an image 1140, and an image 1150. The image 1110, the image 1120, the image 1130, the image 1140, and the image 1150 of FIG. 11 may respectively correspond to the second image 556, the second image 557, the second image 558, the second image 559, and the image 570 of FIG. 5. An image 1160 of FIG. 11 may correspond to the third image 541 of FIG. 5.

The controller 320 may perform image transition such that the second images that are gradually changed are sequentially output on the display 330 and then the third image is output.

In other words, the display 330 may output the image 1160 through the image transition after sequentially outputting the image 1110, the image 1120, the image 1130, the image 1140, and the image 1150.

For the image transition from the image 1150 to the image 1160, an image transition method corresponding, for example, and without limitation, to an operation in 3D, an image transition method using a dissolve method, an image transition method, or the like, that is executed as a method of extending or reducing using a specific 2D texture/mask are used.

As shown in FIG. 11, as the user watches, through an image transited screen, at least one second image that is simulation-based style transferred and output in real time, until the third image that is an AI-based style transferred image is displayed, the user may finally watch a high quality image without feeling bored. Accordingly, the user satisfaction may be increased.

Furthermore, in an embodiment of the disclosure, the controller 320 may control outputting of at least one second image and the third image on a display during execution of an ambient service. For example, when setting an ambient service screen, the controller 320 may perform the above-described AI-based style transfer 540 and simulation-based style transfer 550, and control outputting of the generated at least one second image and third image.

Furthermore, the controller 320 may control the repeatedly displaying of the at least one second image and the third image on the display 330 by the image transition method. Furthermore, the controller 320 may control repeatedly displaying of at least one image selected from among the at least one second image and the third image on the display 330 by the image transition method.

As illustrated in FIG. 11, through a screen where images are transited, a user may watch at least one of second images that are simulation-based style transferred and output in real time, during the time until the third image that is an AI-based style transferred image is displayed. Accordingly, the user may at last watch a high quality image without feeling bored. Accordingly, a display apparatus according to an embodiment of the disclosure may increase user satisfaction.

Figure 12:
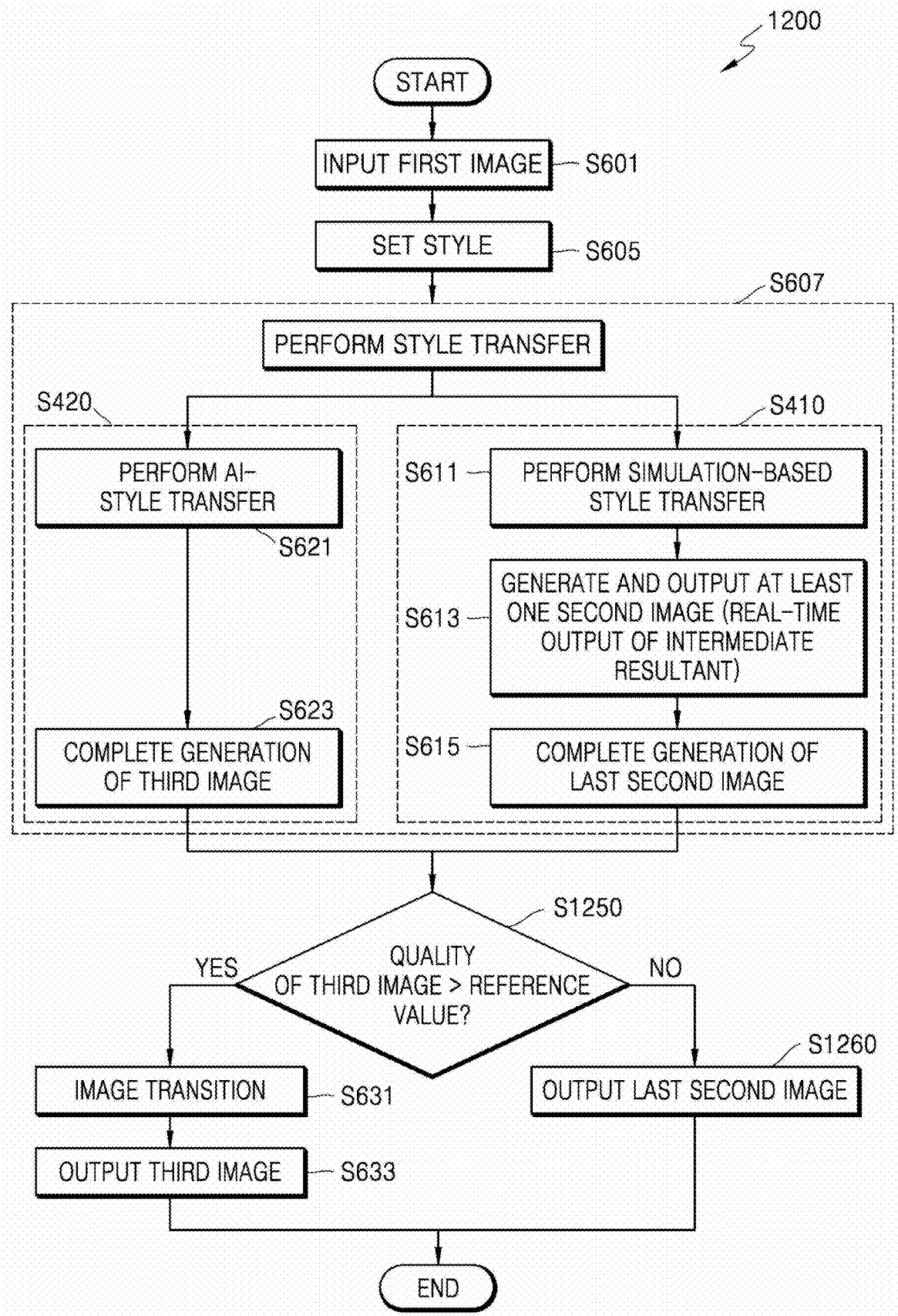
FIG. 12 is a flowchart illustrating an example method of controlling a display apparatus, according to another embodiment of the disclosure.

FIG. 12 is a flowchart illustrating an example method 1200 of controlling a display apparatus according to another example embodiment of the disclosure. Furthermore, the method 1200 of controlling a display apparatus illustrated in FIG. 12 may be performed in the display apparatus 300 or 1300 according to an example embodiment of the disclosure. Accordingly, FIG. 12 illustrates operations performed, for example, in the display apparatus 300 or 1300.

Furthermore, in FIG. 12, the same elements as those in FIG. 6 are illustrated using the same reference numerals. Accordingly, in the description of the method 1200 of controlling a display apparatus, descriptions redundant with those of FIG. 6 may not be repeated.

In an embodiment of the disclosure, the controller 320 may determine whether the quality of the third image satisfies a certain reference before image transition from a last second image, for example, the image 1150, to the third image, for example, the image 1160 (S1250), and perform image transition according to a result of the determination.

For example, the controller 320 may determine whether the quality of the third image, for example, the image 1160, is equal to or greater than or exceeds a certain reference value (S1250), and when the quality of the third image, for example, the image 1160, is equal to or greater than a certain reference value, may perform image transition (S631). When the quality of the third image, for example, the image 1160, is less than or equal to or less than the certain reference value, the controller 320 may not perform the image transition, and continuously output the last second image, for example, the image 1150 (S1260).

The quality of the third image may correspond to the image quality of the third image, and the controller 320 may perform an assessment of the image quality of the third image (S1250). For example, an image quality assessment method may include, for example, and without limitation, a no-reference image quality assessment (NR IQA) method. The NR IQA method may estimate image quality without information about reference image, for example, an original image.

For example, according to the NR IQA method, the quality of an image may be assessed by detecting blur or wave phenomenon. To this end, using an NR IQA algorithm for detecting visual artifact to seek particular distortion, outline information is extracted from an image and then outline diffusion or outline distribution are sought for. When a particular distribution is found in a predefined database, for example, a database indicating an outline distribution where distortion is present, the generated image, for example, an AI-based style transferred third image, may be determined to be a case in which an image cannot be used because the image contains severe distortion. Accordingly, the controller 320 may prevent display of the third image, and may continuously output the last second image, for example, the image 1150 (S1260).

According to the AI-based style transfer, the user is neither able to check an intermediate resultant, nor anticipate the shape of the third image that is the last resultant. Accordingly, an image that the user recognizes to have distortion may be output. For an image that the user recognizes to have distortion, the user may determine that the output third image has no or low artistic quality, work quality, and/or creativity, and in this example, user satisfaction may be increased by preventing the display of the third image.

In an example embodiment of the disclosure, after the third image is output (S633), when the user inputs a request to prevent the third image from being output, through the user interface 1320, the controller 320 may control the last second image, for example, the image 1150, to be output again.

Figure 14:
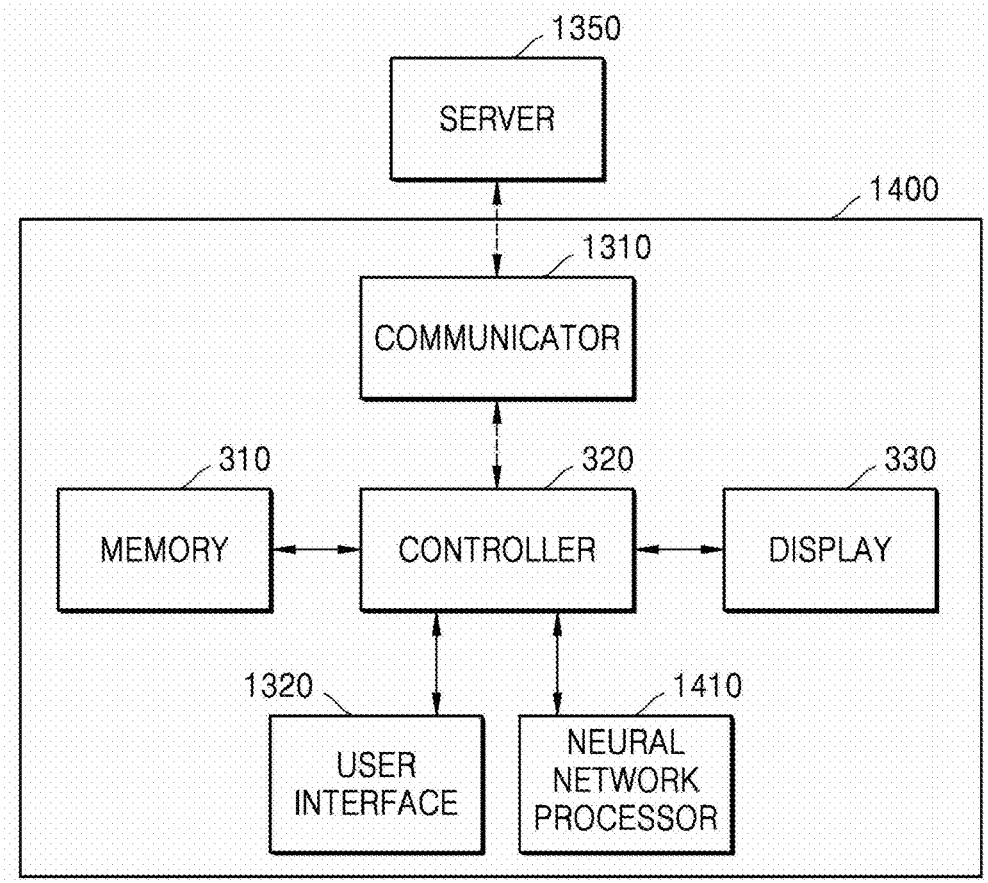
FIG. 14 is another block diagram illustrating an example display apparatus according to another embodiment of the disclosure.

FIG. 14 is another block diagram illustrating an example display apparatus 1400 according to another example embodiment of the disclosure. The display apparatus 1400 illustrated in FIG. 14 may correspond to the display apparatus 1300 illustrated in FIG. 13. Furthermore, in FIG. 14, the same elements as those in FIG. 13 are illustrated using the same reference numerals. Accordingly, in the description of the display apparatus 1400, descriptions redundant with those of the display apparatus 1300 may not be repeated.

Referring to FIG. 14, the display apparatus 1400 may further include a neural network processor 1410 compared with the display apparatus 1300 illustrated in FIG. 13.

The display apparatus 1400 may perform an operation through a neural network at the controller 320 or the external apparatus, for example, the server 1350. Furthermore, the display apparatus 1400 may further include the neural network processor 1410 that may be a separate processor performing an operation through a neural network.

The neural network processor 1410 may perform an operation through a neural network. For example, in an embodiment of the disclosure, the neural network processor 1410 may perform an operation for style transfer through a neural network by performing one or more instructions. For example, the neural network processor 1410 may generate the third image by performing an AI-based style transfer operation.

According to the embodiments of the disclosure illustrated in FIGS. 13 and 14, as an operation of a neural network is performed by an external apparatus such as a server, the speed, time, and quality of the AI-based style transfer may be further improved.

Figure 15:
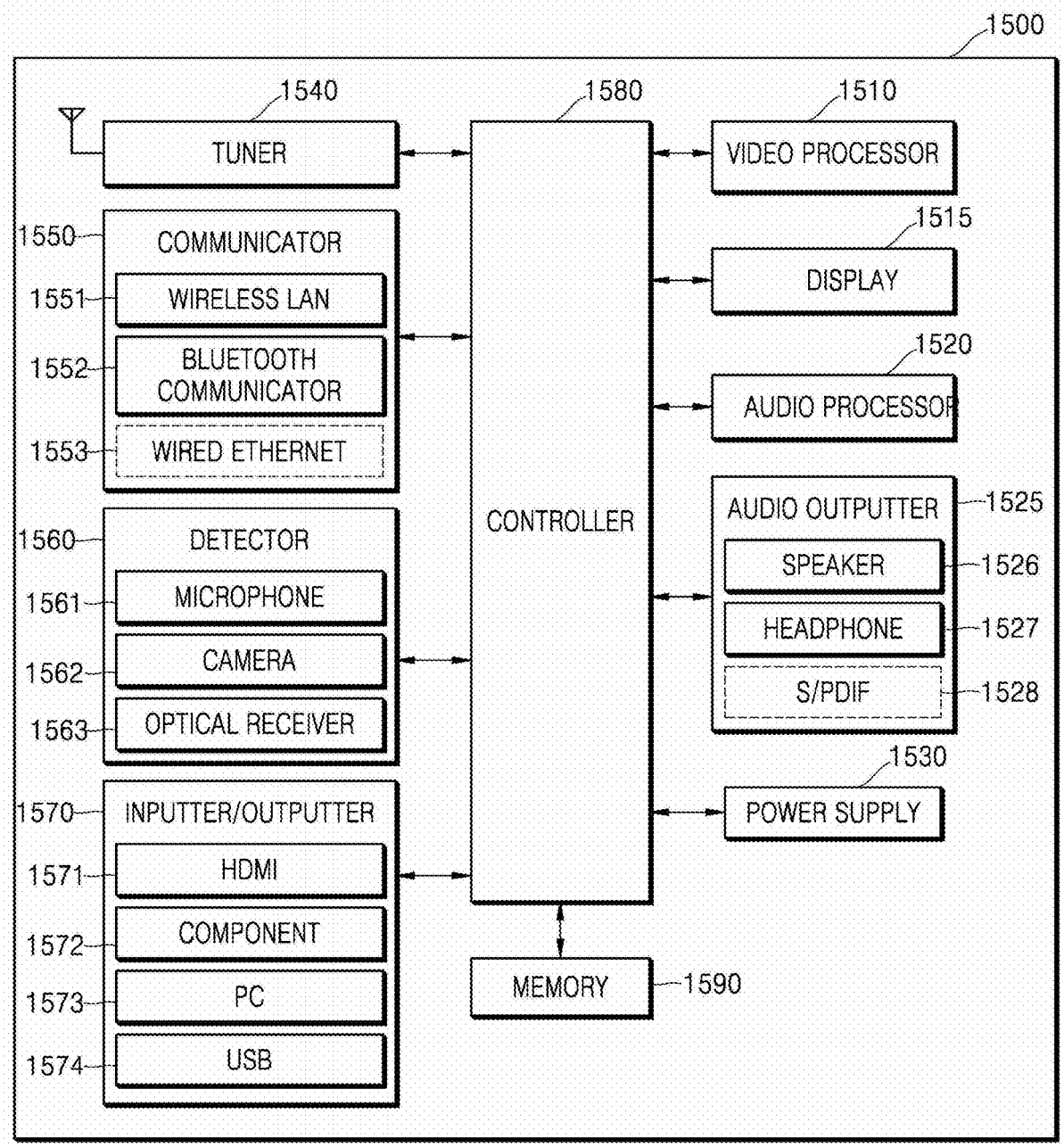
FIG. 15 is another block diagram illustrating an example display apparatus according to another embodiment of the disclosure.

FIG. 15 is another block diagram illustrating an example display apparatus 1500 according to another example embodiment of the disclosure. The display apparatus 1500 according to another example embodiment of the disclosure may correspond to the display apparatus 300, 1300, or 1400 according to the example embodiments of the disclosure described with reference to FIGS. 1 to 14. Accordingly, in the description of the display apparatus 1500, descriptions redundant with those of FIGS. 1 to 14 may not be repeated.

Referring to FIG. 15, the display apparatus 1500 may include a video processor (e.g., including video processing circuitry) 1510, a display 1515, an audio processor (e.g., including audio processing circuitry) 1520, an audio outputter (e.g., including audio outputting circuitry) 1525, a power supply 1530, a tuner 1540, a communicator (e.g., including communication circuitry) 1550, a detector (e.g., including detecting or sensing circuitry) 1560, an inputter/outputter (e.g., including input/output circuitry) 1570, a controller (e.g., including processing circuitry) 1580, and a memory 1590.

The controller 1580 may correspond to the controller 320 illustrated in FIGS. 3, 13, and 14. The communicator 1550, the display 1515, and the memory 1590 of the display apparatus 1500 may respectively correspond to the communicator 1310, the display 330, and the memory 310 illustrated in FIGS. 13 and 14. Accordingly, in the description of the display apparatus 1500 of FIG. 15, descriptions redundant with those of the display apparatus 300, 1300, or 1400 according to example embodiments of the disclosure may not be repeated.

The video processor 1510 may include various video processing circuitry and performs processing on the video data received by the display apparatus 1500. In the video processor 1510, various image processing such as, for example, and without limitation, decoding, scaling, noise filtering, frame rate conversion, resolution conversion, or the like, with respect to video data may be performed.

The controller 1580 may include various processing circuitry and control receiving of a write request for the video data processed in the video processor 1510, and encryption of the video data to be written to a memory device (not shown), for example, RAM (not shown), included in the controller 1580 or the memory 1590.

The display 1515 may display on a screen a video included in a broadcast signal received through the tuner 1540 under the control of the controller 1580. Furthermore, the display 1515 may display contents, for example, a moving picture, input through the communicator 1550 or the inputter/outputter 1570.

Furthermore, the display 1515 may output an image stored in the memory 1590 under the control of the controller 1580. Furthermore, the display 1515 may display a voice user interface (UI) including, for example, a voice instruction guide, to perform a voice recognition task corresponding to voice recognition, or a motion UI including, for example, a user's motion guide for motion recognition, to perform a motion recognition task corresponding to motion recognition.

The audio processor 1520 may include various audio processing circuitry and performs audio data processing. In the audio processor 1520, various processing such as, for example, and without limitation, decoding, amplification, noise filtering, or the like, with respect to audio data may be performed. The audio processor 1520 may include a plurality of audio processing modules to process audio corresponding to a plurality of contents.

The audio outputter 1525 may include various audio output circuitry and outputs audio included in a broadcast signal received through the tuner 1540 under the control of the controller 1580. Furthermore, the audio outputter 1525 may output audio stored in the memory 1590 under the control of the controller 1580. The audio outputter 1525 may output audio, for example, voice or sound, input through the communicator 1550 or the inputter/outputter 1570. The audio outputter 1525 may include, for example, and without limitation, at least one of a speaker 1526, a headphone output terminal 1527, an S/PDIF (Sony/Philips Digital Interface) output terminal 1528, or the like. The audio outputter 1525 may include a combination of the speaker 1526, the headphone output terminal 1527, and the S/PDIF output terminal 1528.

In an embodiment of the disclosure, the speaker 1526 may output a sound wave signal. For example, the speaker 1526 may output an ultrasonic signal.

The power supply 1530 supplies power input from an external power source to constituent elements 1510 to 1590 in the display apparatus 1500 under the control of the controller 1580. Furthermore, the power supply 1530 may supply power output from one or more batteries (not shown) located inside the display apparatus 1500 to the constituent elements 1510 to 1590 under the control of the controller 1580.

The tuner 1540 may select a broadcast signal received by wire or wirelessly by tuning only a frequency of a channel to be received by the display apparatus 1500 from among many radio wave components through amplification, mixing, or resonance. The broadcast signal may include, for example, and without limitation, audio, video, additional information, for example, electronic program guide (EPG), or the like.

The tuner 1540 may receive a broadcast signal in frequency range corresponding to a channel number, for example, cable broadcast No. 506, according to a user's input, for example, a control signal received by an external control apparatus (not shown), for example, a remote controller, for example, a channel number input, a channel up-down input, and a channel input on EPG screen.

The tuner 1540 may receive a broadcast signal from various sources such as terrestrial broadcasting, cable broadcasting, satellite broadcasting, and Internet broadcasting. The tuner 1540 may receive a broadcast signal from a source such as analog broadcasting or digital broadcasting. The broadcast signal received through the tuner 1540 may be decoded, for example, audio decoding, video decoding, or additional information decoding, so as to be classified into audio, video, and/or additional information. The classified audio, video, and/or additional information may be stored in the memory 1590 under the control of the controller 1580.

The tuner 1540 of the display apparatus 1500 may be single or plural. When the tuner 1540 includes a plurality of tuners according to one embodiment of the disclosure, a plurality of broadcast signals may be output to a plurality of windows forming a multi-window screen provided to the display 1515.

The tuner 1540 may be implemented as an all-in-one type with the display apparatus 1500 or as a separate apparatus having a tuner electrically connected to the display apparatus 1500, for example, a set-top box (not shown) or a tuner (not shown) connected to the inputter/outputter 1570.

The communicator 1550 may include various communication circuitry and connect the display apparatus 1500 to an external apparatus, for example, an audio apparatus, under the control of the controller 1580. The controller 1580 may transmit/receive contents to/from the external apparatus connected through the communicator 1550, or download an application from the external apparatus or perform web-browsing. In detail, the communicator 1550 may connect to a network to receive contents from an external apparatus (not shown).

As described above, the communicator 1550 may include various modules including various communication circuitry including, for example, and without limitation, at least one of a short-range communication module (not shown), a wired communication module (not shown), a mobile communication module (not shown), or the like.

In FIG. 15, an example in which the communicator 1550 includes one of a wireless LAN 1551, a Bluetooth communicator 1552, and a wired Ethernet 1553 is illustrated.

Furthermore, the communicator 1550 may include a module combination including one or more of a wireless LAN 1551, a Bluetooth communicator 1552, and a wired Ethernet 1553. Furthermore, the communicator 1550 may receive a control signal of a control apparatus (not shown) under the control of the controller 1580. The control signal may be implemented in a Bluetooth type, an RF signal type, or a WIFI type.

The communicator 1550 may further include, in addition to Bluetooth, other short-range communication, for example, near field communication (NFC; not shown) or a separate Bluetooth low energy (BLE) module (not shown).

The detector 1560 may include various detecting or sensing circuitry and detect users voice, users image, or user's interaction.

A microphone 1561 may receive voice uttered by the user. The microphone 1561 may convert the received voice to an electric signal and output the electric signal to the controller 1580. The user's voice may include, for example, voice corresponding to a menu or function of the display apparatus 1500. For example, a recommended recognition range of the microphone 1561 is within 4 m from the microphone 1561 to the position of a user, and the recognition range of the microphone 1561 may vary corresponding to the volume of user's voice and the circumstance, for example, speaker sound or ambient noise.

The microphone 1561 may be implemented as an integral type and a separate type with respect to the display apparatus 1500. The microphone 1561 that is of a separate type may be electrically connected to the display apparatus 1500 through the communicator 1550 or the inputter/outputter 1570.

It would be easily understood by a person skilled in the art that the microphone 1561 may be excluded according to the performance and structure of the display apparatus 1500.

A camera 1562 receives an image, for example, continuous frames, corresponding to a user's motion including gesture in a camera recognition range. For example, a recognition range of the camera 1562 may be within 0.1 m to 5 m from the camera 1562 to a user. The user's motion may include, for example, a part or the user's body or a motion of the part of the user's body such as a user's face, a facial expression, a hand, a fist, or a finger. The camera 1562 may convert a received image to an electric signal and output the electric signal to the controller 1580 under the control of the controller 1580.

The controller 1580 may select a menu displayed on the display apparatus 1500 by using a result of recognition of the received motion or perform control corresponding to the motion recognition result. For example, the control according to the result of recognition of the received motion may include a channel change, a volume control, or a cursor movement.

The camera 1562 may include a lens (not shown) and an image sensor (not shown). The camera 1562 may support optical zoom or digital zoom by using a plurality of lenses and image processing. The recognition range of the camera 1562 may be variously set according to the angle or a camera and ambient conditions. When the camera 1562 includes a plurality of cameras, a 3D still image or a 3D motion may be received by using a plurality of cameras.

The camera 1562 may be implemented as an integral type or a separate type with respect to the display apparatus 1500. A separate apparatus (not shown) including the camera 1562 of a separate type may be electrically connected to the display apparatus 1500 through the communicator 1550 or the inputter/outputter 1570.

It would be easily understood by a person skilled in the art that the camera 1562 may be excluded according to the performance and structure of the display apparatus 1500.

An optical receiver 1563 may receive an optical signal including a control signal received from an external control apparatus (not shown) through an optical window (not shown) in a bezel of the display 1515. The optical receiver 1563 may receive an optical signal corresponding to a user's input, for example, touch, press, touch gesture, voice, or motion, from a control apparatus (not shown). A control signal may be extracted from the received optical signal under the control of the controller 1580.

For example, the optical receiver 1563 may receive a signal corresponding to a pointing position of a control apparatus (not shown) and transmit the signal to the controller 1580. For example, a user interface screen to receive a user's input of data or a command is output through the display 1515, and when the user inputs the data or command to the display apparatus 1500 through the control apparatus, the optical receiver 1563 may receive a signal corresponding to a movement of the control apparatus when the user moves the control apparatus while contacting with a finger a touch pad (not shown) provided in the control apparatus (not shown), and may transmit the signal to the controller 1580. Furthermore, the optical receiver 1563 may receive a signal indicating that a particular button provided in the control apparatus is pressed, and may transmit the signal to the controller 1580. For example, when the user presses with a finger a button-type touch pad (not shown) provided in the control apparatus, the optical receiver 1563 may receive a signal indicating that the button-type touch pad is pressed, and may transmit the signal to the controller 1580. For example, the signal indicating that the button-type touch pad is pressed may be used as a signal for selecting one of items.

The inputter/outputter 1570 may include various input/output circuitry and receive video, for example, moving picture, audio, for example, voice or music, and additional information, for example, EPG from the outside of the display apparatus 1500 under the control of the controller 1580. The inputter/outputter 1570 may include, for example, and without limitation, one or more of a high-definition multimedia interface (HDMI) port 1571, a component jack 1572, a PC port 1573, and a USB port 1574. The inputter/outputter 1570 may include a combination of the HDMI port 1571, the component jack 1572, the PC port 1573, and the USB port 1574.

It would be easily understood by a person skilled in the art that the configuration and operation of the inputter/outputter 1570 may be variously implemented according to an example embodiment of the disclosure.

The controller 1580 may include various processing circuitry and control an overall operation of the display apparatus 1500 and a signal flow between internal elements (not shown) of the display apparatus 1500, and may perform a function of processing data. When a user's input exists or a preset stored condition is met, the controller 1580 may execute an operation system (OS) and various applications stored in the memory 1590.

The controller 1580 may include RAM (not shown) used to store a signal or data input from the outside of the display apparatus 1500 or used as a storage area corresponding to various jobs performed in the display apparatus 1500, ROM (not shown) storing a control program for the control of the display apparatus 1500, and a processor (not shown).

The processor may include a graphics processing unit (GPU; not shown) for graphics processing corresponding to a video. The processor may be implemented by a system-on-chip (SoC) incorporating a core (not shown) and a GPU (not shown). The processor may include a single core, a dual core, a triple core, a quad core, and a multiple core thereof.

Furthermore, the processor may include a plurality of processors. For example, the processor may be implemented by a main processor (not shown) and a sub-processor (not shown) operating in a sleep mode.

A graphic processor (not shown) may generate a screen including various objects such as an icon, an image, and text by using an operator (not shown) and a renderer (not shown). The operator may calculate attribute values such as coordinate value, shape, size, or color for displaying each of objects according to a layout of the screen by using the user interaction detected through a detector (not shown). The renderer may generate a screen of various layouts including objects based on the attribute values calculated by the operator. A screen generated by the renderer is displayed in a display are of the display 1515.

As described above, according to an embodiment of the disclosure, the user may watch an image having a unique style, for example, an AI-based style transferred third image, without feeling bored, during the time until the image is style transferred and generated. Accordingly, according to example embodiments of the disclosure, user satisfaction and user convenience may be increased.

The example embodiments of the disclosure may be embodied in form of a program command executable through various computing devices, and may be recorded on a computer-readable medium. Also, the example embodiments of the disclosure may be embodied by a computer-readable recording medium having recorded thereon programs including instructions to execute the above-mentioned control method of a display apparatus.

The computer-readable recording medium may include a program command, a data file, a data structure, etc. solely or by combining the same. A program command recorded on the medium may be specially designed and configured for the disclosure or may be a usable one, such as computer software, which is well known to one of ordinary skill in the art to which the disclosure pertains to. A computer-readable recording medium may include magnetic media such as hard discs, floppy discs, and magnetic tapes, optical media such as CD-ROM or DVD, magneto-optical media such as floptical disks, and hardware devices such as ROM, RAM flash memory, which are configured to store and execute a program command. An example of a program command may include not only machine codes made by a compiler, but code executable by an interpreter.

Furthermore, the above-described control method of a display apparatus, according various example embodiments of the disclosure may be embodied as computer program products including a recording medium storing a program executing an operation of obtaining a sentence configured by a multi-language; and an operation of obtaining vector values corresponding to respective words included in the sentence configured by the multi-language, converting the obtained vector values to vector values corresponding to a target language, and obtaining a sentence configured by the target language based on the converted vector values.

Various example embodiments of the disclosure are described with reference to the accompanying drawings, but the disclosure is not limited thereto and it will be understood that various changes in form and details may be made therein without departing from the spirit and scope of the disclosure.

What is claimed is:

1. A display apparatus comprising:
a display;
a memory configured to store at least one instruction; and
a controller comprising at least one processor configured to execute the at least one instruction,
wherein the controller is configured to control the display apparatus to:
define a first style corresponding to a certain texture;
control generation of at least one second image to be gradually changed by performing style transfer including image processing of a first image to have the first style corresponding to the certain texture;
control generation of a third image by performing an operation for style transfer of the first image using a neural network in parallel with the generation of the at least one second image, wherein, in response to the first image being received to the neural network, the neural network outputs the third image; and
perform image transition to output, on the display, the third image after the at least one second image is gradually changed and sequentially output.

2. The display apparatus of claim 1, wherein the controller is configured to further control the display apparatus to:
generate the at least one second image by performing a simulation-based style transfer to allow the first image to have the certain texture applied based on edge information of the first image.

3. The display apparatus of claim 1, wherein the at least one second image includes third image and fourth image which is generated after generation of the third image,
wherein the controller is configured to further control the display apparatus to:
control outputting of the third image on the display, and, control outputting of the fourth image on the display after output of the third image.

4. The display apparatus of claim 1, wherein the controller is configured to further control the display apparatus to:
control generation of the third image corresponding to the first style by performing an operation through the neural network for style transfer of the first image.

5. The display apparatus of claim 1, wherein the controller is configured to further control the display apparatus to:
obtain a content image and style of the first image, and generate the third image by converting the style of the first image to correspond to the first style while maintaining the content image, by performing an operation through the neural network.

6. The display apparatus of claim 1, wherein the controller comprises a first photo filter corresponding to the first style by performing a simulation-based style transfer, and
the controller is further configured to control the display apparatus to control generation of the at least one second image using the first photo filter.

7. The display apparatus of claim 6, wherein the controller is configured to further control the display apparatus to:
control generation of the at least one second image by performing image processing to allow the first image to have the first style using the first photo filter, based on receiving an input selecting the first style, the first style being one of a plurality of different styles.

8. The display apparatus of claim 7, further comprising
a communicator comprising communication circuitry configured to perform communication with an external apparatus,
wherein the controller is configured to further control the display apparatus to:
receive the input selecting the first style from among the plurality of styles from the external apparatus through the communicator.

9. The display apparatus of claim 1, further comprising
a communicator comprising communication circuitry configured to perform communication with an external apparatus configured to perform an operation for the style transfer through the neural network,
wherein the controller is configured to further control the display apparatus to:
control receiving of the third image obtained as the external apparatus performs an operation through the neural network.

10. The display apparatus of claim 1, wherein the neural network
comprises a convolution neural network (CNN) configured to repeatedly perform a convolution operation to allow the first image to correspond to the first style.

11. The display apparatus of claim 1, wherein the controller is configured to further control the display apparatus to:
control outputting of the at least one second image and the third image on the display during execution of an ambient service.

12. A method of controlling a display apparatus, the method comprising:
defining a first style corresponding to a certain texture;
generating at least one second image to be gradually changed by performing style transfer including image processing of a first image to have the first style corresponding to the certain texture;
generating a third image by performing an operation for style transfer of the first image using a neural network in parallel with the generation of the at least one second image, wherein, in response to the first image being received to the neural network, the neural network outputs the third image; and
performing image transition to output, on the display, the third image after the at least one second image is gradually changed and sequentially output.

13. The method of claim 12, wherein the generating of the at least one second image comprises:
generating the at least one second image by performing a simulation-based style transfer to allow the first image to have the certain texture based on edge information of the first image.

14. The method of claim 12, wherein the generating of the third image comprises generating the third image corresponding to the first style by performing an operation through the neural network for style transfer of the first image.

15. The method of claim 12, further comprising
receiving an input selecting the first style from among a plurality of different styles.

16. The method of claim 12, wherein the neural network comprises:
a convolution neural network (CNN) configured to repeatedly perform a convolution operation to allow the first image to correspond to the first style.

17. The method of claim 12, wherein the outputting of the third image comprises:
outputting the at least one second image and the third image on the display while the display apparatus executes an ambient service.

18. A method of controlling a display apparatus, the method comprising:
defining a first style corresponding to a certain texture;
generating at least one second image to be gradually changed by performing style transfer including image processing of a first image to have the first style by repeatedly drawing the certain texture on at least one portion of an image corresponding to the certain texture,
generating a third image by performing an operation for style transfer of the first image using a neural network, and
performing image transition to output, on the display, the third image after the at least one second image that is gradually changed is sequentially output, wherein the generating of the third image further comprises:
generating, by an external apparatus connected to the display apparatus through a communication network, the third image through the neural network; and
transmitting the third image from the external apparatus to the display apparatus.

* * * * *